United States Patent
Jang et al.

(10) Patent No.: US 10,533,857 B2
(45) Date of Patent: Jan. 14, 2020

(54) USER TERMINAL AND CONTROL METHOD THEREOF

(71) Applicant: Samsung Electronics Co., Ltd., Suwon-si, Gyeonggi-do (KR)

(72) Inventors: Ji-hoon Jang, Yongin-si (KR); Du-seok Kim, Yongin-si (KR); Hyun-cheol Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 15/367,767

(22) Filed: Dec. 2, 2016

(65) Prior Publication Data

US 2017/0160089 A1 Jun. 8, 2017

(30) Foreign Application Priority Data

Dec. 3, 2015 (KR) .......................... 10-2015-0171346

(51) Int. Cl.
*G01C 21/16* (2006.01)
*G01C 21/18* (2006.01)
(Continued)

(52) U.S. Cl.
CPC ............. *G01C 21/206* (2013.01); *G01C 5/06* (2013.01); *G01C 21/165* (2013.01); *G01C 21/18* (2013.01); *G01C 21/20* (2013.01); *G01C 21/3423* (2013.01); *G01C 21/3632* (2013.01); *H04W 4/029* (2018.02)

(58) Field of Classification Search
CPC ........ G01C 5/06; G01C 21/165; G01C 21/18; G01C 21/20; G01C 21/206; G01C 21/3423; G01C 21/3632; H04W 4/029
See application file for complete search history.

(56) References Cited

U.S. PATENT DOCUMENTS 8,498,805 B2 7/2013 Joong et al.
8,723,688 B2 5/2014 Carboon et al.
(Continued)

FOREIGN PATENT DOCUMENTS

JP 2014-185925 A 10/2014
JP 2015-206676 A 11/2015
(Continued)

OTHER PUBLICATIONS

Partial European Search Report dated Jul. 6, 2018, issued in the European Application No. 16871103.4.
(Continued)

*Primary Examiner* — Robert T Nguyen
(74) *Attorney, Agent, or Firm* — Jefferson IP Law, LLP

(57) ABSTRACT

A user terminal and a control method thereof are provided. The control method of a user terminal includes registering a first point, acquiring movement information of the user terminal using a motion sensor when the user terminal moves from the first point to a second point, and providing a user interface (UI) for guiding to the first point on the basis of the movement information if a user command for a return is input. As a result, the user terminal makes it possible to provide the route guidance service to a destination by tracking the moving route of the user terminal when the global positioning system (GPS) signal may not be received.

20 Claims, 16 Drawing Sheets

(51) Int. Cl.
*G01C 21/20* (2006.01)
*G01C 21/34* (2006.01)
*G01C 21/36* (2006.01)
*G01C 5/06* (2006.01)
*H04W 4/029* (2018.01)

(56) References Cited

U.S. PATENT DOCUMENTS

| | | | |
|---|---|---|---|
| 8,976,063 B1 | 3/2015 | Hawkins et al. | |
| 9,019,129 B2 | 4/2015 | Skinder et al. | |
| 9,354,076 B2 | 5/2016 | Iwasawa et al. | |
| 9,921,073 B2* | 3/2018 | Rhee | G01C 21/3644 |
| 10,165,406 B2* | 12/2018 | Hong | H04W 4/029 |
| 2008/0140286 A1 | 6/2008 | Jung | |
| 2009/0210145 A1 | 8/2009 | Amano | |
| 2014/0232570 A1 | 8/2014 | Skinder et al. | |
| 2014/0288827 A1 | 9/2014 | Iwasawa et al. | |
| 2015/0168159 A1* | 6/2015 | Chao | G01C 21/30 701/428 |
| 2015/0241213 A1* | 8/2015 | Garin | G01C 5/005 73/384 |
| 2016/0094941 A1* | 3/2016 | Shen | H04W 64/006 455/456.1 |
| 2018/0245927 A1* | 8/2018 | Frish | G01C 21/165 |

FOREIGN PATENT DOCUMENTS

| | | |
|---|---|---|
| KR | 10-0635103 B1 | 10/2006 |
| KR | 10-2013-0143389 A | 12/2013 |
| KR | 10-1474793 B1 | 12/2014 |
| KR | 10-2015-0071398 A | 6/2015 |
| WO | 2012/078140 A1 | 6/2012 |
| WO | 2015/120908 A1 | 8/2015 |

OTHER PUBLICATIONS

Extended European Search Report dated Oct. 11, 2018, issued in a counterpart European application No. 16871103.4.
European Office Action dated Oct. 29, 2019, issued in European Patent Application No. 16871103.4.

* cited by examiner

FIG. 14A
FIG. 14B
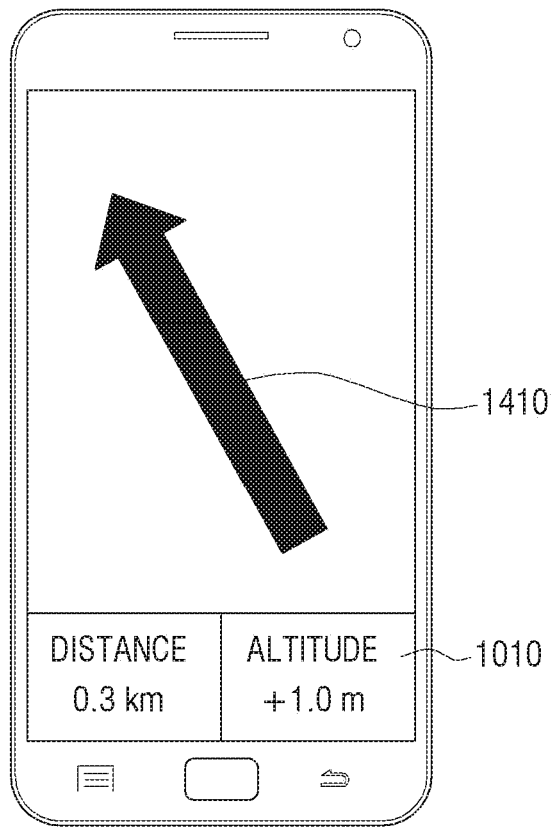
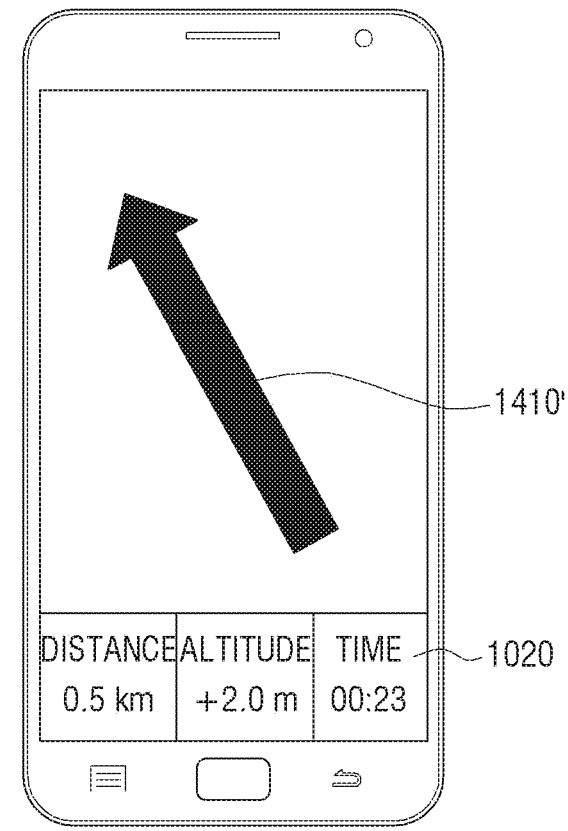

USER TERMINAL AND CONTROL METHOD THEREOF

CROSS-REFERENCE TO RELATED APPLICATION(S)

This application claims under 35 U.S.C. § 119(a) of a Korean patent application filed on Dec. 3, 2015 in the Korean Intellectual Property Office and assigned Serial number 10-2015-0171346, the entire disclosure of which is hereby incorporated by reference.

TECHNICAL FIELD

The present disclosure relates to a user terminal and a control method thereof. More particularly, the present disclosure relates to a user terminal for providing a moving route of the user terminal and a control method thereof.

BACKGROUND

In the case of large parking lots such as a hypermarket and a department store, a size of a parking lot is not only very large but vehicles may also be parked on a plurality of floors. Therefore, a user needs to be well-informed of a number corresponding to an area in which a vehicle is parked or a moving route from a point where his and her vehicle is parked.

If a user is not well-informed of a number corresponding to the area in which his/her vehicle is parked or is miss-informed of the moving route, the problem in that the user needs to find a location where his/her vehicle is parked or needs to find his/her vehicle at a location different from a floor where his/her vehicle is parked is often caused.

Therefore, various methods for more easily and quickly providing a location where a user's vehicle is parked have been researched and developed. As a representative example, there is a method for receiving, by a user terminal, a global positioning system (GPS) signal and providing a path on which a vehicle is parked on the basis of the received GPS signal.

However, the existing method for providing location information often has a problem in that intensity of the GPS signal is weak or the GPS signal may not be received, when a vehicle is parked underground. Therefore, a user terminal 100 has a problem in that a route guidance service about a location where a user's vehicle is parked may be provided inaccurately or the route guidance service may not be provided.

The above information is presented as background information only to assist with an understanding of the present disclosure. No determination has been made, and no assertion is made, as to whether any of the above might be applicable as prior art with regard to the present disclosure.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide route guidance to a user even when a global positioning system (GPS) signal may not be received.

Another aspect of the present disclosure tracks a moving route of a user terminal using various sensors mounted in a user terminal to provide route guidance.

In accordance with an aspect of the present disclosure, a control method of a user terminal is provided. The control method includes registering a first point, acquiring movement information of the user terminal using a motion sensor when the user terminal moves from the first point to a second point, and providing a user interface (UI) for guiding to the first point on the basis of the movement information if a user command for a return is input.

The registering of the first point may include determining user activity using the motion sensor, and registering a point where the user terminal is located as the first point when the user activity satisfies a preset condition.

The movement information of the user terminal may include information on a number of steps of a user using the user terminal and information on movement direction of the user terminal and in which the acquiring of the movement information may comprise acquiring the information on the number of steps of the user using an accelerometer sensor and the movement information of the user terminal using a gyroscope sensor.

The movement information of the user terminal may further include information on a change in altitude of the user terminal and in which the acquiring of the movement information may comprise acquiring the change in altitude of the user terminal using a pressure sensor.

In the acquiring, the moving information may comprise filtering moving information having the specific pattern among the movement information of the user terminal when a moving pattern of the user terminal has a specific pattern while the user terminal moves.

The control method may further include: displaying a moving route UI on the basis of the movement information acquired in real time while the user terminal moves from the first point to the second point.

In the providing of the UI, a route guidance UI including an indicator in an arrow form indicating a direction returning to the first point may be provided if the user command for return is input.

In the providing of the UI, a feedback guiding that the user terminal approaches the first point may be provided when the user terminal is located within a specific distance from the first point.

In the providing of the UI, a route guidance UI including an entire route moving from the second point to the first point may be provided and a location of the user terminal may be provided within an overall route in real time, if the user command for return is input.

In the providing of the UI, at least one of distance information, altitude information, estimated time of arrival information between the first point and the user terminal may be provided in one region.

In accordance with another aspect of the present disclosure, a user terminal is provided. The user terminal includes a display, a sensor sensing a motion of the user terminal, a memory storing movement information of the user terminal, and at least one processor configured to store a first point in the memory on the basis of the motion sensed by the sensor, acquire the movement information of the user terminal using the sensing information sensed by the sensor when the user terminal moves from the first point to the second point, and control the display to display a UI for guiding to the first point on the basis of the movement information if a user command for a return is input.

The at least one processor may use the motion sensor to determine user activity and register a point where the user terminal is located as the first point and store the first point in the memory when the user activity satisfies a preset condition.

The movement information of the user terminal may include information on a number of steps of a user using the user terminal and information on movement direction of the user terminal and the at least one processor may acquire the information on the number of steps of the user using an accelerometer sensor, and acquire the movement information of the user terminal using a gyroscope sensor.

The movement information of the user terminal may further include information on a change in altitude of the user terminal and the at least one processor may acquire the change in altitude of the user terminal using a pressure sensor.

The at least one processor may filter moving information having the specific pattern among the movement information of the user terminal when a moving pattern of the user terminal has a specific pattern while the user terminal moves.

The at least one processor may control the display to display a moving route UI on the basis of the movement information acquired in real time while the user terminal moves from the first point to the second point.

The at least one processor may control the display to display the route guidance UI including an indicator in an arrow form indicating a direction returning to the first point if the user command for return is input.

The at least one processor may provide a feedback guiding that the user terminal approaches the first point when the user terminal is located within a specific distance from the first point.

The at least one processor may control the display to display a route guidance UI including an entire route moving from the second point to the first point and display the location of the user terminal within the overall route in real time, if the user command for return is input.

The at least one processor may control the display to display at least one of distance information, altitude information, estimated time of arrival information between the first point and the user terminal in one region.

In accordance with another aspect of the present disclosure, a non-transitory computer-readable storage medium configured to store one or more computer programs including instructions that, when executed by at least one processor, cause the at least one processor to control for registering a first point, acquiring movement information of a user terminal using a motion sensor when the user terminal moves from the first point to a second point and providing a UI for guiding to the first point on the basis of the movement information if a user command for a return is input.

As described above, according to the various embodiments of the present disclosure, it is possible to provide the route guidance service to a destination by tracking the moving route of the user terminal when the GPS signal may not be received.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 14A and 14B illustrate diagrams for displaying a route guidance UI in a user terminal according to various embodiments of the present disclosure;

Throughout the drawings, it should be noted that like reference numbers are used to depict the same or similar elements, features, and structures.

DETAILED DESCRIPTION

Figure 1:
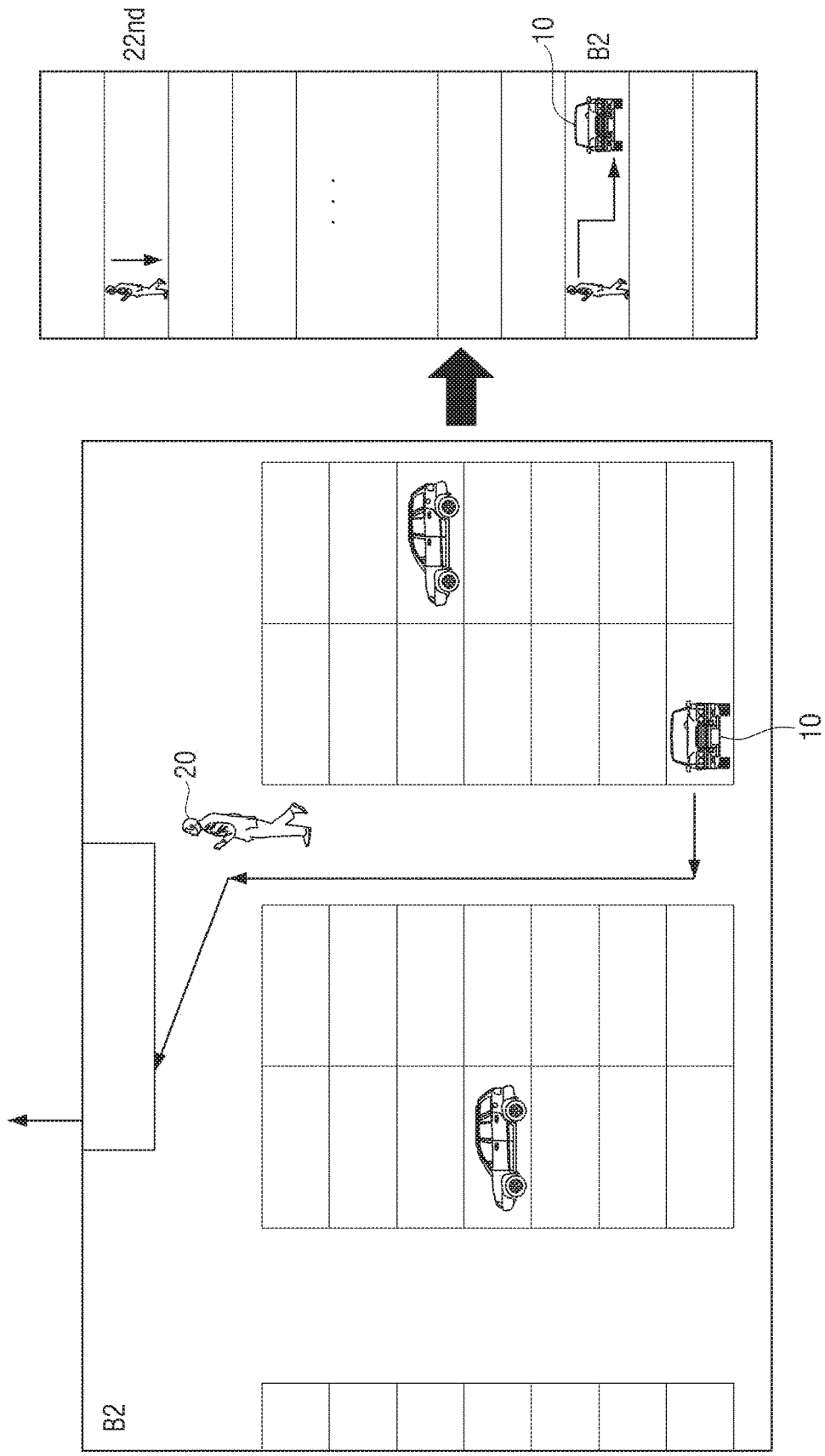
FIG. 1 is a diagram for providing a route guidance service according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary.

Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

First, terms used in the present specification and claims are selected as general terms in consideration of functions of various embodiments of the present disclosure. However, these terms may be changed depending on intention of a person in the art, legal or technical analysis, appearance of new technologies, or the like. Further, some terms may be arbitrarily selected by the present applicant. These terms may be analyzed as meaning defined in the present specification, and if terms are not defined in detail, the terms may also be analyzed based on the overall content of the present specification and general technology knowledge of the technical field in the art.

Further, like reference numerals or signs described in the respective drawings accompanying in the present specification represent parts or components performing substantially the same function. For convenience of explanation and understanding, other various embodiments will be described using like reference numerals or signs. In other words, even though components having like reference numerals are all illustrated in a plurality of drawings, the plurality of drawings do not mean an exemplary embodiment.

Further, to differentiate between components in the present specification and claim, terms including ordinal numbers like "first", "second", or the like may be used. The ordinal numbers are used to differentiate like or similar components from each other and the meaning of the terms should not be restrictively analyzed by the use of the ordinal numbers. For example, a use order, a disposition order, or the like of components coupled to the ordinal numbers should not be limited by the numbers. If necessary, the respective ordinal numbers may also be used by being replaced by each other.

In the present specification, singular forms are intended to include plural forms unless the context clearly indicates otherwise. It will be further understood that the terms "comprises" or "have" used in this specification, specify the presence of features, numerals, steps, operations, components, parts mentioned in this specification, or a combination thereof, but do not preclude the presence or addition of one or more other features, numerals, steps, operations, components, parts, or a combination thereof.

Further, in the various embodiments of the present disclosure, the terms "module", "unit", "part", etc., are terms naming components for performing at least one function or operation and these components may be implemented as hardware or software or implemented by a combination of hardware and software. Further, the plurality of "modules", "units", "parts", etc., may be integrated as at least one module or chip to be implemented as at least one processor (not illustrated), except for the case in which each of the "modules", "units", "parts", etc., needs to be implemented as individual specific hardware.

Further, in the various embodiments of the present disclosure, when any portion is connected to other portions, this includes a direct connection and an indirect connection through other media. In addition, unless explicitly described otherwise, the meaning that any portion includes any components will be understood to imply the inclusion of other components but not the exclusion of any other components.

Hereinafter, various embodiments of the present disclosure will be described in detail with reference to the accompanying drawings.

FIG. 1 is a diagram for providing a route guidance service according to an embodiment of the present disclosure.

Referring to FIG. 1, a user parks his/her vehicle 10 in a parking area and then may get out of the vehicle 10 and then move. Meanwhile, the area in which the vehicle 10 is parked may be an area in which a global positioning system (GPS) signal is not received. In this case, a user terminal 100 (shown in FIG. 2) uses various sensors mounted in the user terminal 100 to determine whether the vehicle 10 is driving or is in a parked state. As the determination result, if it is determined that the vehicle 10 is in the parked state, the user terminal 100 registers a point (hereinafter, referred to as a first point) where the vehicle 10 is parked based on user motion information sensed when the vehicle 10 is parked and time information when the corresponding motion information is sensed. Next, the user terminal 100 uses various sensors included in the user terminal 100 to track a moving route of the user.

In detail, the user terminal 100 may track the moving route of the user on the basis of information on the number of steps of a user 20 using the user terminal 100 and information on a movement direction of the user terminal 100.

The moving route of the user 20 is stored in the user terminal 100 in real time and the user terminal 100 may track the moving route of the user 20 before a preset event is generate and store the tracked route. According to an embodiment of the present disclosure, the user terminal 100 may track the moving route of the user 20 before a user command for return is input and store the tracked route.

If the user command for return is input, the user terminal 100 displays a UI that guides the movement to the first point where the vehicle 10 is parked on the basis of the stored moving route immediately before the user command for return is input.

As illustrated, the user 20 may park the vehicle 10 in a first area of the second basement (B2)-level parking lot and then move to the 22nd floor of a building, in which the corresponding parking lot is present, on foot. Next, the user 20 may request route guidance from the 22nd floor to a location where his/her vehicle 10 is located. If the user command is input, the user terminal 100 may display a route guidance user interface (UI) that guides a movement from a point (second point) where the user 20 is currently located to the first point where the vehicle 10 is parked, on the basis of the moving route of the user from the first point where the vehicle 10 is parked to the 22nd floor.

Therefore, the user may refer to the route guidance UI displayed on the user terminal 100 to move to the first area of the second basement-level parking lot in which his/her vehicle 10 is parked.

Figure 2:
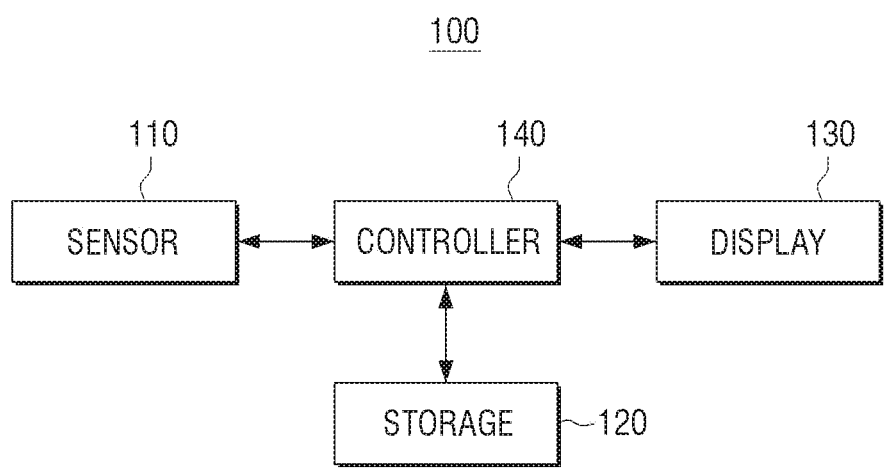
FIG. 2 is a block diagram of a user terminal according to an embodiment of the present disclosure.
Figure 3:
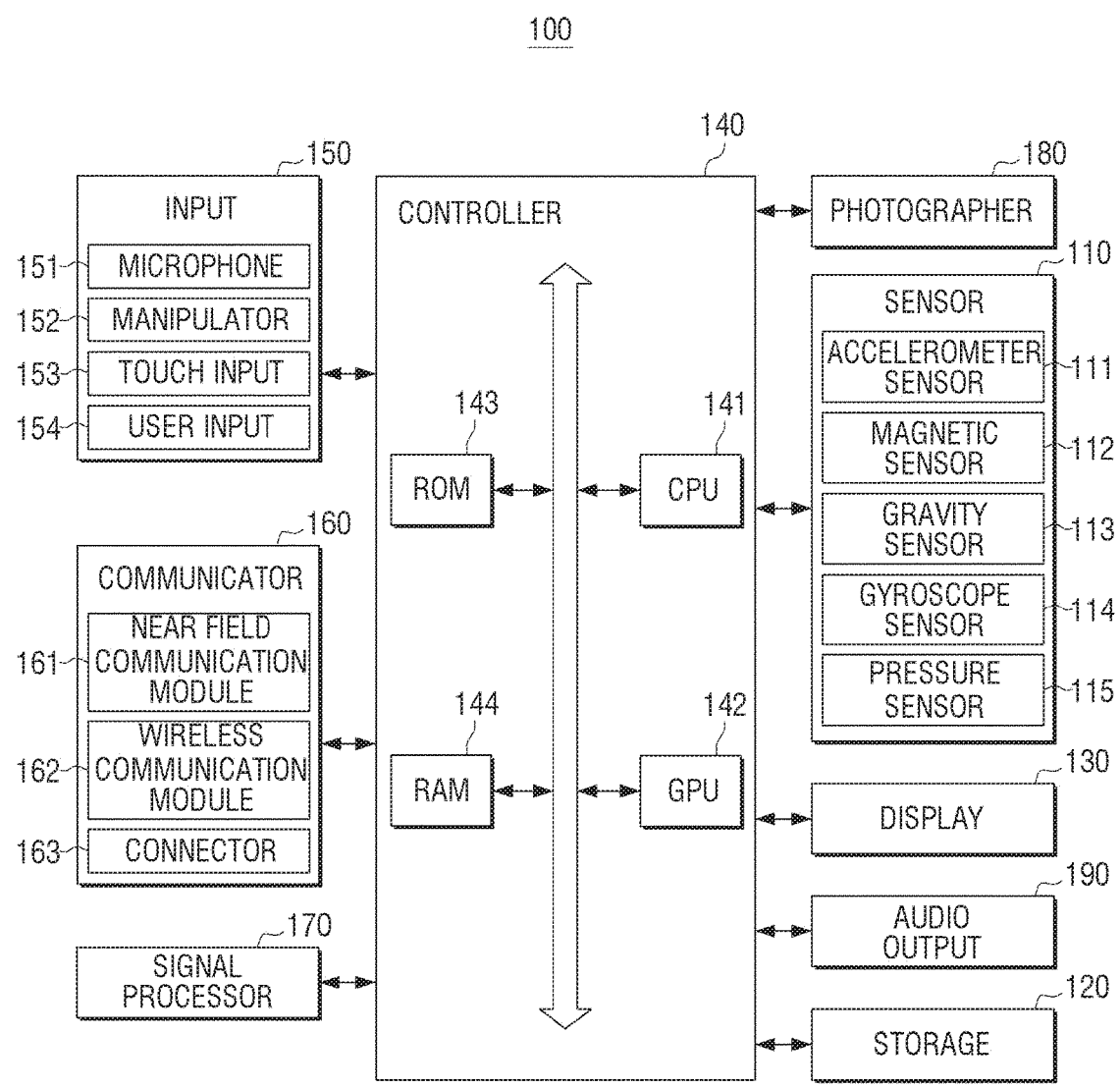
FIG. 3 is a detailed block diagram of a user terminal according to an embodiment of the present disclosure.

FIG. 2 is a block diagram of a user terminal according to an embodiment of the present disclosure and FIG. 3 is a detailed block diagram of a user terminal according to an embodiment of the present disclosure.

Referring to FIG. 2, the user terminal 100 like a smart phone or a tablet personal computer (PC) may include a sensor 110, a storage 120, a display 130, and a controller 140.

The sensor 110 is a sensing sensor that senses the motion of the user terminal 100 and referring to FIG. 3, may include at least one of an accelerometer sensor 111, a magnetic sensor 112, a gravity sensor 113, a gyroscope sensor 114, and a pressure sensor 115.

The accelerometer sensor 111 is a sensor measuring an acceleration or an impact strength of the moving user terminal 100 and is an essential sensor that is used for various transport means such as a vehicle, a train, and an airplane and control systems such as a robot as well as electronic devices such as a smart phone and a tablet PC.

The magnetic sensor 112 is an electronic compass that may detect an azimuth using an earth's magnetic field and is sensor that is used for positioning, three dimensional (3D) video game, or the like or used for a smart phone, a radio set, GPS, personal digital assistant (PDA), a navigation device or the like.

The gravity sensor 113 is a sensor detecting in which direction gravity is applied and is a sensor that automatically rotates depending on a direction in which the user holds the user terminal 100 to sense the direction or serves to record a crash direction of a vehicle, or the like.

The gyroscope sensor 114 is a sensor that adds a rotation function to the existing accelerometer sensors to recognize a 6-axis direction to thereby help recognize a more elaborate and precise operation. The pressure sensor 115 is a sensor that acquires an altitude change of the user terminal 100 on the basis of pressure information measured by a pressure sensor 115.

Meanwhile, the present disclosure describes only the case in that the sensor 110 includes at least one of the accelerometer sensor 111, the magnetic sensor 112, the gravity sensor 113, and the gyroscope sensor but is not limited thereto. Therefore, the sensor 110 may further include a proximity sensor (not illustrated) that is used to determine how much an object is approached prior to contacting another object, an optical sensor (not illustrated) that senses received light and converts the light into an electrical signal, or the like.

The storage 120 stores the movement information of the user terminal 100 acquired based on the motion information of the user terminal 100 sensed by the sensor 110. Here, the movement information of the user terminal 100 may be information acquired on the moving route along which the user gripping the user terminal 100 moves from the first point to the second point.

In detail, an object of the present disclosure is to guide a point where the vehicle of the user is parked under the environment in which it is difficult to receive a GPS signal. In this case, the first point where the user starts to move may be a location where the vehicle of the user is parked. Therefore, the movement information of the user terminal 100 stored in the storage 120 may be the information acquired on the moving route along which the user moves from the first point where the vehicle is parked to the second point.

The storage 120 storing the movement information of the user terminal 100 may further store an operating program for controlling the operation of the user terminal 100. Here, when the user terminal 100 is turned on, an operating program is a program that read by the storage 120 and compiled and thus operates each component of the user terminal 100. The storage 120 may be implemented by at least one of a memory card (for example, secure digital (SD) card, memory stick) that may be detached from/attached to read only memory (ROM), random access memory (RAM), or the user terminal 100, a non-volatile memory, a volatile memory, a hard disk drive (HDD), and a solid state drive (SSD).

The controller 140 coupled to RAM 144 and ROM 143 may generally control the operation of the user terminal 100 or may control the overall operation of the user terminal 100. The controller 140 may be used with a central processing unit (CPU) 141, a graphic processing unit (GPU), a microprocessor, or the like and may copy various programs stored in the storage 120 in the RAM and execute the programs copied in the RAM to perform various operations. The controller 140 may be implemented by a system-on-a chip (SOC) or a system on chip (Soc) by being combined with various components such as the foregoing sensor 110 and an input 150, a communicator 160, or the like that will be described below.

The controller 130 acquires the movement information of the user terminal 100 on the basis of the sensing information sensed based on the motion of the user terminal 100 moving from the first point to the second point through the sensor 110 and stores the acquired movement information of the user terminal 100 in the storage 120. Next, if the user command for return is input from the user, the controller 130 controls the display 130 to generate the UI for guiding the user from the point where the user is currently located to the first point on the basis of the movement information stored in the storage 120 and display the generated UI.

The display 130 displays the UI (hereinafter, referred to a route guidance UI) for guiding the user from the point where the user is currently located to the first point depending on a control command of the controller 130 on a screen. Therefore, the user may move to a location where his/her vehicle is parked through the route guidance UI displayed on the display 130.

In addition, the display 130 may display content received from an external server like a content server (not illustrated) or a pre-stored content related data or display various UI screens for controlling the operation of the user terminal 100.

The display 130 may be implemented as a liquid crystal display (LCD), an organic light emitting display (OLED), a plasma display panel (PDP), or the like. In particular, the display 130 may be implemented in a touch screen form having a mutual layer structure with a touch input 153 receiving a touch command of a user to be described below.

Meanwhile, when the foregoing controller 140 senses the motion of the user terminal 100 using the sensor 110, the controller 140 may perform the following operations to acquire the movement information of the user terminal 100.

In detail, when the controller 140 senses the motion of the user terminal 100 using the sensor 110, the controller 140 determines user activity on the basis of the sensed motion information. As the determination result, when the user activity satisfies the preset conditions, the controller 140 may register the point where the user terminal 100 is currently located as the first point.

Meanwhile, the controller 140 determines whether the preset event is generated prior to determining the user activity and if it is determined that the event is generated, preferably determines the user activity on the basis of the motion information sensed by the sensor 110. For example, while the user is driving the vehicle, the controller 140 determines whether an event on whether the vehicle is parked is generated prior to determining the user activity.

That is, the controller 140 may determine whether the event on whether the vehicle is parked is generated according to the following embodiment of the present disclosure.

According to an embodiment of the present disclosure, the controller 130 may determine that the event on whether the vehicle is parked is generated on the basis of whether a communication connection between a near field communication (NFC) module 161 like Bluetooth (BT) and an electronic device of the vehicle is released. Generally, when the vehicle starts, power is supplied to electronic devices like navigation of the vehicle and the user terminal 100 may perform data communication with the electronic devices of the vehicle through the NFC module 161 like BT. Therefore, the controller 130 may determine that the vehicle is parked if the communication connection between the NFC module 161 and the electronic devices of the vehicle is released.

According to another embodiment of the present disclosure, the controller 130 may determine the electronic devices having a high search frequency as the electronic device of the vehicle, on the basis of search list information about peripheral electronic devices searched by the NFC module 161 like BT. Therefore, the controller 130 may determine whether the vehicle is parked if the previously determined electronic devices based on the search list information searched by the NFC module 161 are not searched.

In addition, the controller 130 may determine that the vehicle is parked if the electronic devices registered by the user are not searched by the NFC module 161.

Meanwhile, when the vehicle temporarily stops, the communication connection between the NFC module 161 and the electronic devices of the vehicle is temporarily released or the electronic devices of the corresponding vehicle may not be temporarily searched in the search list information. In this case, the controller 130 may determine whether the communication connection between the NFC module 161 and the electronic devices of the vehicle is reconnected within a preset threshold time or the electronic devices of the vehicle are not searched within the preset threshold time to determine whether the event that the vehicle is parked is generated.

If it is determined that the event that the vehicle is parked is generated according to various embodiments of the present disclosure, the controller 140 determines the user activity on the basis of the motion information sensed by the sensor 110. As the determination result, if it is determined that the user activity satisfies the preset conditions, the controller 140 may register the point where the user terminal 100 is currently located as the first point. Here, the first point represents timing at which the user parks the vehicle and then starts to walk and may be a point at which his/her vehicle is when the user returns to a point where his/her vehicle is parked.

In detail, if it is determined that the event that the vehicle is parked is generated, the controller 140 determines whether the GPS signal is received through the communicator 160 to be described below. As the determination result, if the GPS signal is received, the controller 140 may register the location information at the timing at which the GPS signal is received as the first point.

Meanwhile, when the GPS signal is not received, the controller 140 may determine the use activity on the basis of the sensing information sensed by the accelerometer sensor 111. That is, as described above, if it is determined that the event that the vehicle is parked is generated, the controller 140 may determine that the motion of the user starts on the basis of the sensing information sensed by the accelerometer sensor 111 after the timing at which it is determined that the event is generated. Therefore, after the timing at which it is determined that the event is generated, the controller 140 may register the sensing information and the time information sensed by the accelerometer sensor 111 as the first point where the user terminal 100 is located.

Next, when the user terminal 100 moves from the first point to the second point, the controller 140 may use a plurality of sensors included in the sensor 110 to acquire the movement information of the user terminal 100. Here, the movement information of the user terminal 100 may include the information on the number of steps of the user using the user terminal 100 and the information on the movement direction of the user terminal 100.

In detail, if the first point representing the timing at which the user parks the vehicle and then starts to walk is registered, the controller 140 may use the accelerometer sensor 111 to acquire the information on the number of steps of the user and use the gyroscope sensor 114 to acquire the movement direction information of the user terminal 100.

In more detail, after the first point is registered, the controller 140 determines a step of a user on the basis of the sensing information sensed by the accelerometer sensor 111. That is, the controller 140 may determine the step of the user and the number of steps on the basis of sensing variation sensed by the accelerometer sensor 111. Further, the controller 140 may use the gyroscope sensor 114 to acquire the movement direction information of the user terminal 100 and match the movement direction information per the step of the user and store the matched information in the storage 120. That is, the controller 140 may match the step of the user with the movement direction information of the user per step and store it in the storage 120.

Meanwhile, the controller 140 may acquire the movement direction information of the user terminal 100 according to the following embodiment of the present disclosure.

In detail, the controller 140 creates a world coordinate system from the magnetic sensor 112 and the gravity sensor 113 and aligns angular velocity values of X, Y, and Z axes acquired from the gyroscope sensor 114 on the world coordinate system on the basis of a rotation matrix. Next, the controller 140 may obtain angles per step from the align information per the step of the user determined on the basis of the sensing information sensed by the accelerometer sensor 111 and acquire the movement direction information of the user terminal 100 from the angles per step.

Meanwhile, according to additional aspects of the present disclosure, the movement information of the user terminal 100 may further include information on an altitude change of the user terminal 100. That is, the controller 140 may acquire the altitude change of the user terminal 100 on the basis of pressure information measured by a pressure sensor 115.

According to an embodiment of the present disclosure, if the first point representing the timing at which the user parks the vehicle and then starts to walk is registered, the controller 140 may acquire floor information corresponding to the pressure information measured by the pressure sensor 115 on the basis of the preset pressure information by floor and store the acquired floor information in the movement information of the user terminal 100.

Therefore, if the user command for return is input, the controller 140 may compare the floor information acquired on the basis of the pressure information measured by the pressure sensor 115 at the timing at which the corresponding user command is input with the floor information included in the pre-stored movement information to control the display 130 to display the UI that guides the user to move to an upper floor or a lower floor and then move to the first point.

According to another embodiment of the present disclosure, if the first point representing the timing at which the user parks the vehicle and then starts to walk is registered, the controller 140 may store the pressure information measured by the pressure sensor 115 in the movement information of the user terminal 100.

Therefore, if the user command for return is input, the controller 140 compares the pressure information measured by the pressure sensor 115 with the pressure information included in the pre-stored movement information of the user terminal 100 at the timing at which the corresponding user command is input. As the comparison result, if the difference between the two pressure information is less than a preset threshold value, the controller 140 is determined that the user is located in the same floor as a floor where the vehicle is parked. Therefore, the controller 140 may control the display 130 to display the UI that guides the user to move to the first point without the floor movement.

Meanwhile, if the difference between the two pressure information is equal to or more than the preset threshold value, the controller 140 may determine the movement guidance of the user to an upper or lower floor on the basis of the two pressure information. For example, when the pressure information is lower than the pressure information included in the pre-stored movement information at the timing at which the user command for return is input, the controller 140 determines that the user is at a floor higher than a floor where the vehicle is parked and controls the display 130 to display the UI that guides the user to move to the lower floor.

If the user moves to a lower floor depending on the guidance of the UI, the controller 140 periodically receives the pressure information through the pressure sensor 115 and compares the input pressure information with the pressure information included in the pre-stored movement information to check whether the difference between the two pressure information is less than the preset threshold value. As the check result, if the difference between the two pressure information is less than the preset threshold value, the controller 140 may stop displaying the UI for the floor movement and control the display 130 to display the UI that moves the user to move from the corresponding floor to the first point.

Meanwhile, when a movement pattern of the user terminal 100 has a specific pattern while the user terminal 100 moves, the controller 140 may filter the movement information having the specific pattern among the movement information of the user terminal 100.

For example, a movement pattern depending on the step of the user determined based on the sensing information sensed by the accelerometer sensor 111 while the user is generally walking and the movement pattern depending on the step of the user determined based on the sensing information sensed by the accelerometer sensor 111 while the user is in a movement space like an elevator may be different. Therefore, the controller 140 may compare and analyze the movement patterns per step included in the movement information of the user terminal 100 to filter the movement information having a pattern different from the movement pattern while the user is walking.

Therefore, the controller 140 may record and store only the movement information on the movement direction information per step generated while the user is substantially walking in the storage 120.

Meanwhile, according to additional aspect of the present disclosure, the controller 140 may generate the moving route UI on the basis of the movement information acquired in real time while the user moves from the first point to the second point and may control the display 130 to display the generated moving route UI. Therefore, the display 130 may display the moving route in real time through the moving route UI while the user moves from the first point where his/her vehicle is parked to the second point where the user moves after his/her vehicle is parked.

According to various embodiments of the present disclosure, in the state in which the movement information from the first point where the vehicle of the user is parked to the second point to which the user moves is stored in the storage 120 or is displayed in real time, the controller 140 may provide the following UI according to the user command for return to the first point.

According to an embodiment of the present disclosure, if the user command for return to the first point is input, the controller 140 may control the display 130 to display the route guidance UI including an indicator in an arrow form that indicates the direction returning to the first point. Therefore, the user may move to a location where his/her vehicle is parked through the route guidance UI displayed on the display 130.

Meanwhile, if the user terminal 100 is located within a specific distance from the first point, the controller 140 may control the display 130 to provide a feedback guiding that the user terminal 100 approaches the first point. According to the embodiment of the present disclosure, if the user terminal 100 is located within the specific distance from the first point, the controller 140 may provide at least one of an alarm feedback, a vibration feedback, and a message feedback to guide that the user terminal 100 approaches the first point.

That is, if the number of steps obtained by subtracting the number of steps depending on the movement of the user from the number of steps included in the pre-stored movement information is equal to or less than the preset threshold value, the controller 140 may determine that the user enters the specific distance from the first point and may control the display 130 to provide a feedback guiding that the user approaches the first point. The display 130 provides the feedback guiding that the user approaches the first point according to the control command, and thus the user may recognize that he/she approaches the first point where his/her vehicle is parked.

According to another embodiment of the present disclosure, if the user command for return to the first point is input, the controller 140 may control the display 130 to display the route guidance UI including the overall route moving from the second point where the user is currently located to the first point and may control the display 130 to display the location of the user terminal 100 on the displayed route guidance UI in real time.

According to the control command, the display 130 may display the current location of the user terminal 100 on the route guidance UI including the overall route from the second point where the user is currently located to the first point Therefore, the user may move to the first point where his/her vehicle is located through the route guidance UI indicating the overall route from the second point to the first point and schematically understand the remaining distance from the current location of the user to the first point where his/her vehicle is parked on the basis of the location information of the user terminal 100 displayed on the route guidance UI.

Meanwhile, according to additional aspect of the present disclosure, the controller 140 may control the display 130 to display at least one of distance information, altitude information, and estimated time of arrival information between the first point and the user terminal 100 in one region. According to the control command, the display 130 may display the indicator in an arrow form that indicates the direction returning to the first point or the route guidance UI representing the overall route in one region and may display at least one of the distance information, the altitude information, and the estimated time of arrival information between the second region in which the user terminal 100 is currently located and the first region where the vehicle of the user is parked.

Therefore, the user may move to the first point where the his/her vehicle is located through the route guidance UI displayed in one region and may refer to the information (distance information, altitude information, and estimated time of arrival information) displayed in the other region to more easily confirm the remaining distance from the current location to the first point or a floor where the vehicle is parked.

According to various embodiments of the present disclosure, the moving route from the first point where the vehicle of the user is parked to the second point to which the user moves on foot is tracked and the user terminal 100 providing the route guidance on the basis of the tracked moving route may further include the input 150, the communicator 160, a signal processor 170, a photographer 180, and an audio output 190 as illustrated in FIG. 3, besides the sensor 110, the storage 120, the display 130 and the controller 140 that are described above.

The input 150 is an input means receiving various user commands and transferring the input user command to the controller 140 and as illustrated in FIG. 3, may include a microphone 151, a manipulator 152, a touch input 153, and a user input 154.

The microphone 151 may receive the voice command of the user and the manipulator 151 may be implemented by a key pad including various function keys, a numeric key, a special key, a character key, or the like. Further, when the foregoing display 130 is implemented by a touch screen form, the touch input 153 may be implemented by a touch pad having a mutual layer structure with the display 130. In this case, the touch input 153 may receive a selection command for various application related icons displayed on the display 130.

The user input 154 may receive an IR signal or an RF signal for controlling the operation of the user terminal 100 from at least one peripheral device (not illustrated) like a remote control device.

The communicator 160 performs data communication with at least one other user terminal (not illustrated), the foregoing electronic device (not illustrated) of a vehicle, or the like. As illustrated in FIG. 3 the communicator 160 may include a short range communication module such as the NFC module 161, a wireless communication module 162 such as a wireless local access network (LAN) module, and a connector 163 including at least one of wired communication modules such as a high-definition multimedia interface (HDMI), a universal serial bus (USB), Institute of Electrical and Electronics Engineers (IEEE) 1394.

The NFC module 161 is configured to wirelessly perform NFC between the user terminal 100 and the electronic device (not illustrated) of the vehicle. Here, the NFC module 161 may include at least one of a BT module, an infrared data association (IrDA) module, an NFC module, a WIFI module, and a Zigbee module.

Further, the wireless communication module 162 is a module that is connected to an external network according to a wireless communication protocol such as IEEE to perform communications. In addition, the wireless communication module may further include a mobile communication module which is connected to a mobile communication network according to various mobile communication standards such as 3rd generation (3G), 3rd generation partnership project (3GPP), and long term evolution (LTE) to perform communications.

As such, the communicator 160 may be implemented by the above-mentioned various short range communication schemes and may adopt other communication technologies not mentioned in the present specification as needed.

Meanwhile, the connector 163 is configured to provide an interface with various source devices such as USB 2.0, USB 3.0, HDMI, and IEEE 1394. The connector 163 may receive content data transmitted from an external server (not illustrated) through a wired cable connected to the connector 163 according to the control command of the controller 140 or may transmit pre-stored content data to an external recording medium. Further, the connector 163 may receive power from a power source through the wired cable physically connected to the connector 163.

The signal processor 170 may be configured to process the content received through the communicator 160 and image data and audio data of the content stored in the storage 120, according to the control command of the controller 140. In detail, the signal processor 170 may perform various image processing, such as decoding, scaling, noise filtering, frame rate conversion, and resolution conversion, on the image data included in the content. Further, the signal processor 170 may perform various audio signal processing, such as decoding, amplification, and noise filtering, on the audio data included in the content.

The photographer 180 is to photograph still images or moving images according to the user command and may be implemented in plural like a front camera and a rear camera.

The audio output 190 may output an audio data, which suffers from signal processing by the signal processor 170, as audio signal through a speaker and the foregoing display 130 may display the image data, which suffers from the signal processing by the signal processor 170, on the screen.

Meanwhile, the controller 140 may activate only at least one of the respective components as described above and provide the route guidance service related UI from the point where the user is currently located to the point where the vehicle is parked by at least one activated component. Therefore, the user terminal 100 may provide the route guidance service related UI while reducing current consumption.

According to an embodiment of the present disclosure, the controller 140 may provide the route guidance service related UI from the point where the user is located to the point where the vehicle is parked on the basis of the information sensed by the accelerometer sensor 111, the magnetic sensor 112, the gravity sensor 113, and the gyroscope sensor 114 among the plurality of sensors.

According to another embodiment of the present disclosure, the controller 140 may provide the route guidance service related UI having more improved accuracy than the foregoing embodiment on the basis of the accelerometer sensor 111, the magnetic sensor 112, the gravity sensor 113, the near field wireless communication module 162 like WiFi, and the signal intensity.

According to another embodiment of the present disclosure, the controller 140 may provide the route guidance service related UI on the basis of the accelerometer sensor 111, the magnetic sensor 112, the gravity sensor 113, the gyroscope sensor 114, the near field wireless communication module 162 like WiFi, and the signal intensity. According to an embodiment of the present disclosure, the controller 140 may correct the error on the moving route that occurs due to the movement of the user.

According to another embodiment of the present disclosure, the controller 140 provides the route guidance service related UI on the basis of the information sensed by the accelerometer sensor 111, the magnetic sensor 112, the gravity sensor 113, the gyroscope sensor 114 among the plurality of sensors and activity information recognized by a sensor hub, thereby reducing the current consumption.

Meanwhile, when the GPS signal may be received, the controller 140 may track the moving route of the user on the basis of the accelerometer sensor 111 and the GPS information and determine the location of the area where the vehicle is parked on the basis of the tracked moving route.

Meanwhile, when the GPS signal may not be received, the controller 140 may use the accelerometer sensor 111, the magnetic sensor 112, the gravity sensor 113, and the gyroscope sensor 114 to display the route guide service related UI.

Meanwhile, the controller 140 may understand the recognition of the vehicle and the parked state of the vehicle according to the following embodiment of the present disclosure, prior to providing the route guidance service related UI to the location where the vehicle is parked according to the foregoing various embodiments.

According to an embodiment of the present disclosure, the controller 140 may accurately understand whether the vehicle is the vehicle of the user and the point where the vehicle is parked on the basis of at least one of the accelerometer sensor 111, the magnetic sensor 112, the gravity sensor 113, and BT information.

According to an embodiment of the present disclosure, the controller 140 may accurately understand whether the vehicle is the vehicle of the user and the point where the vehicle is parked on the basis of the accelerometer sensor 111, the magnetic sensor 112, the gravity sensor 113, and an information of on-board diagnosis (OBD) device of the vehicle.

So far, each component of the user terminal 100 according to the exemplary embodiment of the present disclosure will be described in detail. Hereinafter, the operation of providing the route guidance UI depending on the moving route of the user from the user terminal 100 according to an embodiment of the present disclosure will be described in detail.

Figure 4:
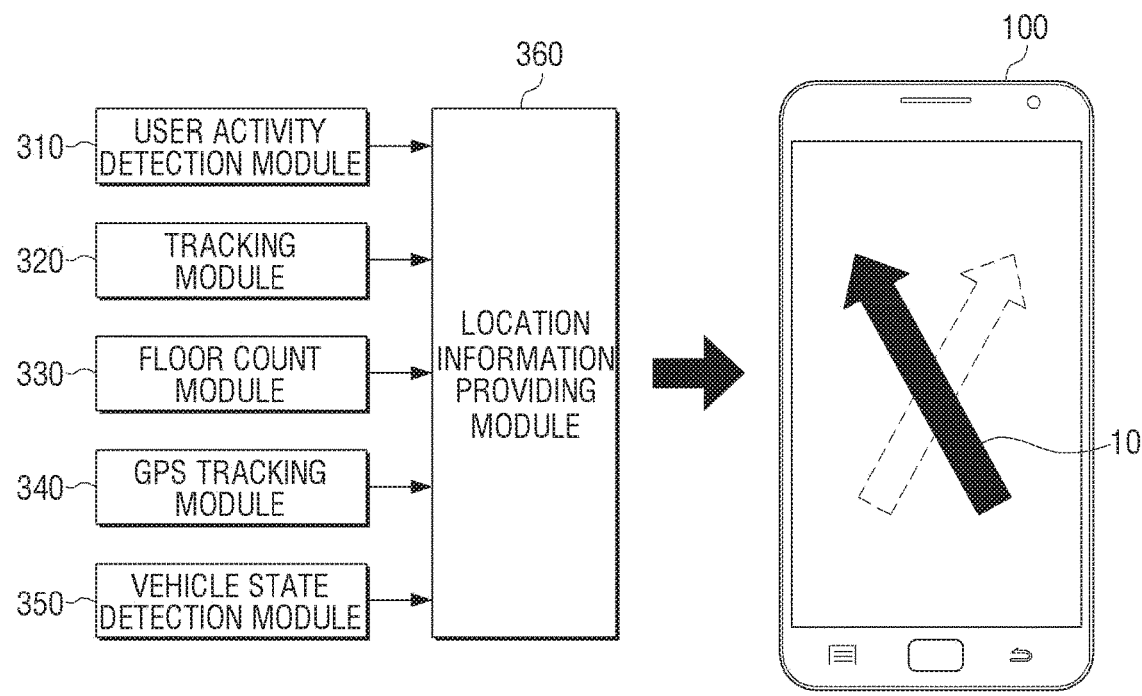
FIG. 4 is a detailed block diagram for providing a route guidance user interface (UI) from a user terminal according to an embodiment of the present disclosure.

FIG. 4 is a detailed block diagram for providing a route guidance UI from a user terminal according to an embodiment of the present disclosure.

Referring FIG. 4, a controller 140 that provides the route guidance UI according to a moving route of the user may include a user activity detection module 310, a tracking module 320, a floor count module 330, a GPS tracking module 340, a vehicle state detection module 350, and a location information providing module 360.

Each module may be stored in the storage 120 and the controller 140 may use the module stored in the storage 120 to provide the route guidance UI depending on the moving route of the user.

In detail, the user activity detection module 310 analyzes the sensing information of the accelerometer sensor 111 included in the sensor 110 of the user terminal 100 to recognize the motion activity of the user. That is, the user activity detection module 310 may analyze the sensing information of the accelerometer sensor 111 to recognize the motion activity of the user to determine whether the user is walking, the vehicle is driving, or whether the movement of the user stops and register the point where the user terminal 100 is located if it is determined whether the user is walking.

The tracking module 320 uses the accelerometer sensor 111, the magnetic sensor 112, the gravity sensor 113, and the gyroscope sensor 114 that are included in the sensor 110 of the user terminal 100 to acquire the steps depending on the walking of the user and the movement direction of the user per step and acquires the movement information of the user terminal 100 on the basis of the acquired step and movement direction per step. Therefore, the tracking module 320 may track the moving route of the user from the acquired moving information of the user terminal 100.

The floor counter module 300 is a module that detects the floor where the user is currently located from the variation of the pressure information measured by the pressure sensor 115 included in the sensor 110 of the user terminal 100. Therefore, if the user command for the route guidance is input, the floor count module 330 may guide the movement to the floor where the vehicle is parked on the basis of the floor where the previously detected user is currently located.

When the user terminal 100 may receive the GPS signal, the GPS tracking module 340 may be a module for acquiring the moving information of the user terminal 100 on the basis of the received GPS signal. That is, the GPS tracking module 340 may acquire the location information on the basis of the GPS information per step depending on the movement of the user using the user terminal 100 and acquire the movement information on the basis of the acquired location information. The GPS tracking module 340 may determine whether the GPS signal may be periodically received to acquire the movement information on the basis of the received GPS signal if it is determined that the GPS signal may be received and acquire the movement information on the basis of the movement direction per the step of the user sensed by the motion sensor if it is determined that the GPS signal may not be received.

The vehicle state detection module 350 is a module for detecting whether the vehicle is driving, stopping, or parking.

According to an embodiment of the present disclosure, the vehicle state detection module 350 may determine whether the vehicle is parked on the basis of whether a communication connection between an NFC module 161 like BT and an electronic device of the vehicle is released.

According to another embodiment of the present disclosure, the vehicle state detection module 350 may determine that the electronic device having a high search frequency is the electronic device of the vehicle on the basis of the search list information about peripheral electronic devices searched by the NFC module 161 like BT and may determine that the vehicle is parked if the electronic devices having a high search frequency are not searched in the search list information.

Meanwhile, when the vehicle temporarily stops, the communication connection between the NFC module 161 and the electronic devices of the vehicle is temporarily released or the electronic devices of the corresponding vehicle may not be temporarily searched in the search list information. Therefore, the vehicle state detection module 350 determines whether the NFC module 161 in which the communication connection with the electronic device of the vehicle is released is reconnected with the electronic device of the corresponding vehicle within the preset threshold time or whether the electronic device of the corresponding vehicle is searched within the preset threshold time, prior to determining whether the vehicle is parked according to the foregoing embodiment of the present disclosure. As the determination result, if the NFC module 161 is not reconnected with the electronic device of the vehicle or is not searched within the preset threshold time, the vehicle state detection module 350 may determine that the event that the vehicle is parked is generated.

The location information providing module 360 is a module that back tracks the direction in which the user terminal 100 moves from the acquired moving information based on the information generated from the user activity detection module 310, the tracking module 320, the floor count module 330, the GPS tracking module 340, and the vehicle state detection module 350 to acquire the route guidance information for guiding the location where the vehicle of the user is parked.

If the route guidance information is acquired, the user terminal 100 displays, on the screen, the route guidance UI including an indicator 10 in an arrow form that indicates the direction in which it returns from the point where the current user is located to the first point where the vehicle is parked.

Therefore, the user may move along the indicated direction of the indicator 10 displayed on the screen of the user terminal 100 to return to the first point where his/her vehicle is parked.

Hereinafter, each module as described above will be described in more detail.

Figure 5:
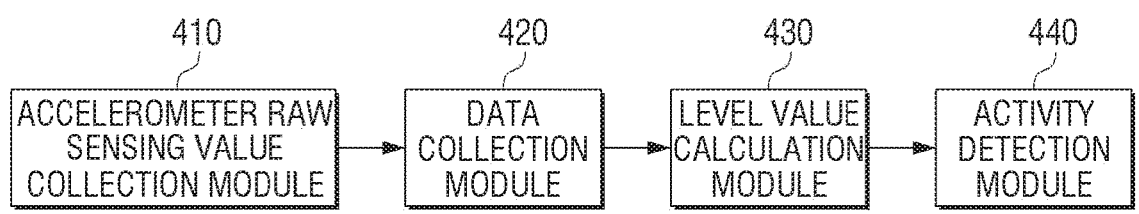
FIG. 5 is a detailed block diagram of a user activity detection module according to an embodiment of the present disclosure.

FIG. 5 is a detailed block diagram of a user activity detection module according to an embodiment of the present disclosure.

Referring to FIG. 5, the user activity detection module 310 may include an accelerometer raw sensing value collection module 410, a data collection module 420, a level value calculation module 430, and an activity detection module 440.

The accelerometer raw sensing value collection module 410 collects the sensing information sensed by the accelerometer sensor 111. Here, the sensing information may be a raw data sensed by the accelerometer sensor 111. Therefore, the data collection module 420 performs signal processing on the raw data sensed by the accelerometer sensor 11 and converts the signal-processed raw data into a digital signal. If the sensing information converted into the digital signal is collected, the level value calculation module 430 calculates a level value from the sensing information converted into the digital signal. Therefore, the activity detection module 440 compares the level value calculated by the level value calculation module 430 with the preset threshold value to determine the user activity. That is, the activity detection module 440 may determine that the user activity is vehicle activity if the level value calculated by the level value calculation module 430 is equal to or more than the preset threshold value, determine that the user activity is stationary activity if the level value is less than the preset threshold value, and determine that user activity is walking activity if the level value is located between the preset threshold values.

Therefore, the activity detection module 440 may determine the timing at which the level value where the user activity is determined to be the stationary activity or the walking activity is calculated as the timing at which the user starts to move on foot and register the corresponding timing as the first point representing the point where the vehicle is parked.

Meanwhile, if the user activity is determined to be the vehicle activity, the activity detection module 440 may register the timing at which the level value where the user activity is determined as the vehicle activity is calculated as the first point representing the point where the vehicle is parked, depending on whether to determine that the vehicle is parked by the foregoing vehicle state detection module 350.

If the first point representing the point where the vehicle is parked by the activity detection module 440 is registered, the tracking module 320 may track the moving route along which the user moves from the first point where the vehicle is parked to the second point.

Figure 6:
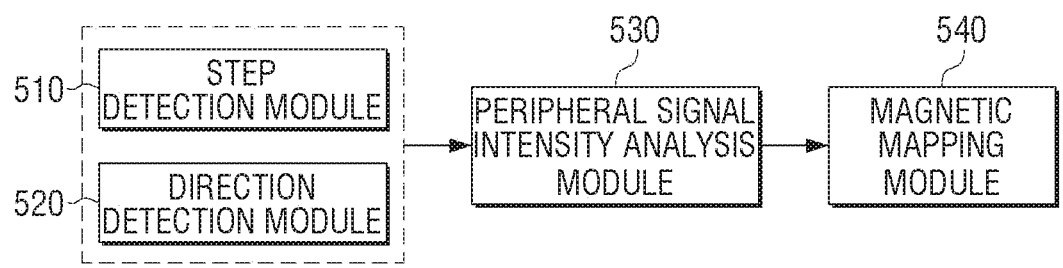
FIG. 6 is a detailed block diagram of a tracking module according to an embodiment of the present disclosure.

The tracking module 320 may be implemented as illustrated in FIG. 6.

FIG. 6 is a detailed block diagram of a tracking module according to an embodiment of the present disclosure.

Referring to FIG. 6, the tracking module 320 may include a step detection module 510, a direction detection module 520, a peripheral signal intensity analysis module 530, and a magnetic mapping module 540.

The step detection module 510 is a module that detects the number of steps for the moving route along which the user moves from the first point where his/her vehicle is parked to the second point and the direction detection module 520 is a module that detects the direction in which the user moves from the first point where his/her vehicle is parked to the second point.

The step detection module 510 and the direction detection module 520 may be implemented as illustrated in FIGS. 7A to 7C and 8.

Figures 7A, 7B, 7C:
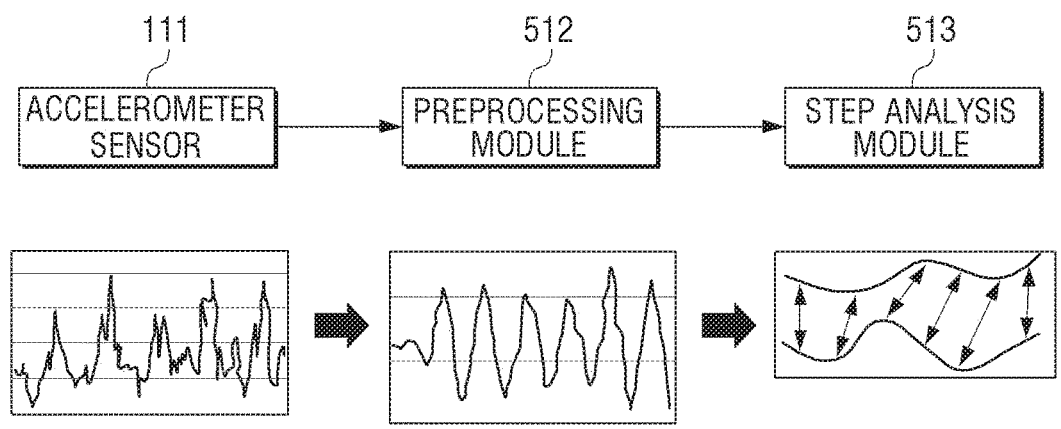
FIGS. 7A, 7B, and 7C are detailed block diagrams of a step detection module according to various embodiments of the present disclosure.
Figure 8:
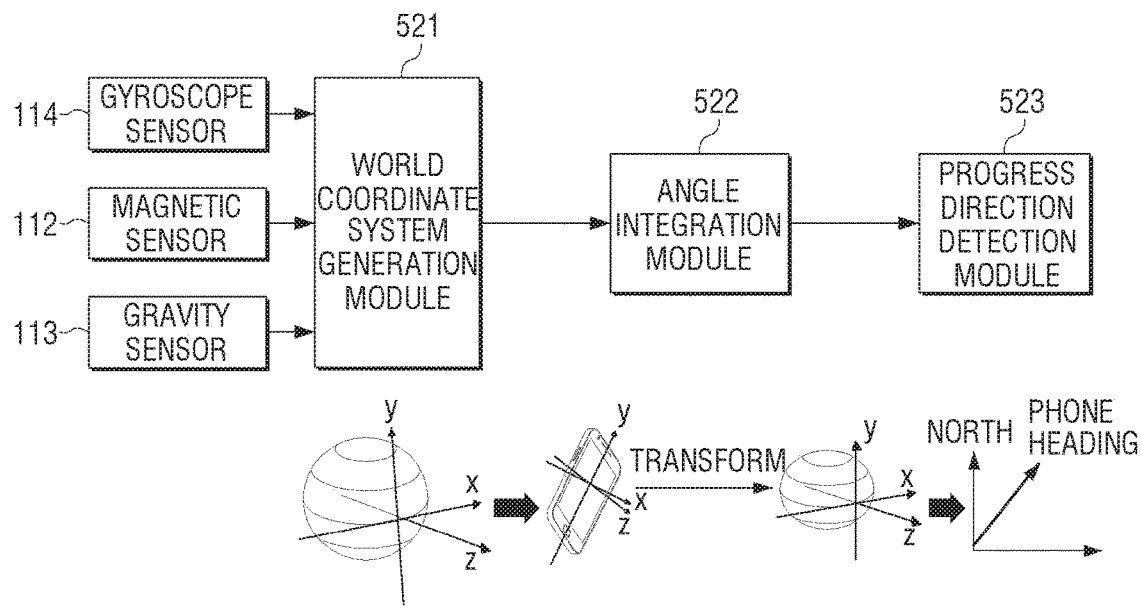
FIG. 8 is a detailed block diagram of a direction detection module according to an embodiment of the present disclosure.

FIGS. 7A to 7C are detailed block diagrams of a step detection module according to an embodiment of the present disclosure, FIG. 8 is a detailed block diagram of a direction detection module according to an embodiment of the present disclosure, and FIGS. 9A to 9D are diagram for acquiring movement information of a user terminal on the basis of movement direction information per step in a tracking module according to an embodiment of the present disclosure.

Referring to FIGS. 7A to 7C, the step detection module 510 may include a pre-processing module 512 and a step analysis module 513.

In detail, the user may move from the first point where his/her vehicle is parked to the second point. Therefore, the accelerometer sensor 111 may measure the acceleration for the motion of the user moving from the first point to the second point. That is, the accelerometer sensor 111 may output the sensing signal depending on the motion of the user as illustrated in FIG. 7A. If the sensing signal is output, the pre-processing module 512 performs the signal processing on the sensing signal output from the accelerometer sensor 111 using the pre-processing process. Therefore, the sensing signal output from the accelerometer sensor 111 may be converted into the sensing signal that suffers from the signal processing by the pre-processing process as illustrated in FIG. 7B.

If the pre-processing process is performed by the pre-processing module 512 to output the sensing signal that suffers from the signal processing, the step analysis module 513 analyzes the movement pattern of the user terminal 100 from the sensing signal that suffers from the signal processing to extract the remaining movement patterns other than a specific pattern when the movement pattern includes the specific pattern. That is, the step analysis module 513 may analyze the movement pattern as illustrated in FIG. 7C to remove a portion having a pattern different from the movement pattern depending on the step of the user and determine the number of steps of the user from the remaining movement patterns.

Meanwhile, referring to FIG. 8, the direction detection module 520 may include a world coordinate system generation module 521, an angle integration module 522, and a progress direction detection module 523.

In detail, the world coordinate system generation module 521 generates a world coordinate on the basis of the sensing information sensed by the magnetic sensor 112 and the gravity sensor 113. Hereinafter, the world coordinate system generation module 521 aligns the angular velocity values of the X, Y, and Z axes acquired from the gyroscope sensor 114 on the world coordinate system on the basis of the rotation matrix.

The angle integration module 522 obtains angles per step from the align information per the step of the user determined based on the sensing information sensed by the accelerometer sensor 111 and the progress direction detection module 523 matches the angles obtained from the align information per step to acquire the movement direction information per step.

Therefore, the tracking module 320 may acquire the movement information of the user terminal 100 on the basis of the movement direction information per the step of the user acquired by the step detection module 510 and the direction detection module 520.

Figure 9A:
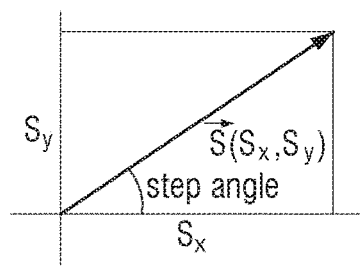
FIGS. 9A, 9B, 9C and 9D illustrate a diagram for acquiring movement information of a user terminal on the basis of movement direction information per step in a tracking module according to various embodiments of the present disclosure.
Figure 9B:
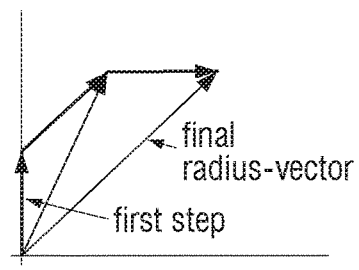
Figure 9D:
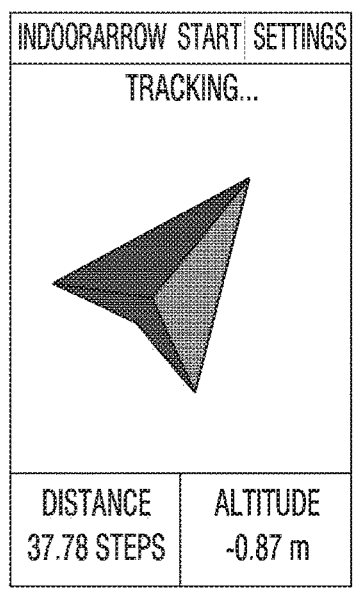
Figure 9C:
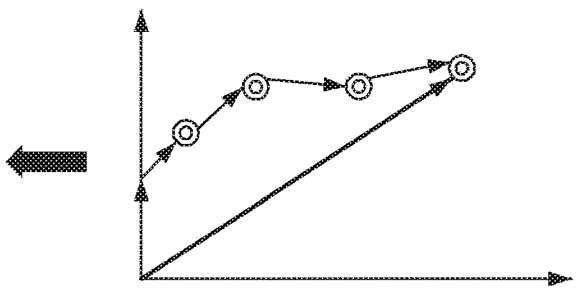

That is, the tracking module 320 may display the movement direction of the user terminal 100 as illustrated in FIG. 9D, on the basis of the movement direction information per step calculated based on the angle obtained by the steps illustrated in FIGS. 9A to 9C.

In addition, the tracking module 320 may register and store the additional information acquired by the peripheral signal intensity analysis module 530 and the magnetic mapping module 540 by including the additional information in the moving information of the user terminal 100. The additional information included in the movement information is information for correcting the route for the movement to the point where the vehicle is parked at the time of the guidance of the route from the second point where the user is located to the first point where the vehicle is parked according to the user command for return to the first point.

In detail, when at least one WiFi signal is received at the first point where the vehicle is parked, the peripheral signal intensity analysis module 530 acquires additional information on the basis of the intensity of the received WiFi signal and the magnetic mapping module 540 acquires the additional information on the basis of the intensity of at least one magnetic signal received at the first point where the vehicle is parked.

To acquire the additional information, the peripheral signal intensity analysis module 530 sets coordinates of the point registered as the first point to be (0, 0). Hereinafter, the peripheral signal intensity analysis module 530 measure the intensity of at least one WiFi signal received through the NFC module 161 for the preset time. In this case, when the received WiFi signal is plural, the peripheral signal intensity analysis module 530 measures the intensity of the WiFi signal having large signal intensity among a plurality of WiFi signals.

Hereinafter, the peripheral signal intensity analysis module 530 may store additional information on the signal intensity measured from the WiFi signal received at the first point set to be (0, 0) by including the additional information in the previously acquired movement information.

Therefore, when the foregoing location information providing module 360 back tracks the direction in which the user terminal 100 moves based on the pre-stored movement information to provide the route guidance information for guiding the location where the vehicle of the user is parked, the location information providing module 360 may correct the moving route in the direction in which the WiFi signal is received based on the signal intensity similar to the intensity of the WiFi signal corresponding to the corresponding additional information using the additional information included in the corresponding movement information to prove the route guide information.

Meanwhile, the magnetic mapping module 540 may acquire the additional information on the basis of the intensity of the magnetic signal received at the first point in a similar manner to the foregoing peripheral signal intensity analysis module 530.

Figure 10:
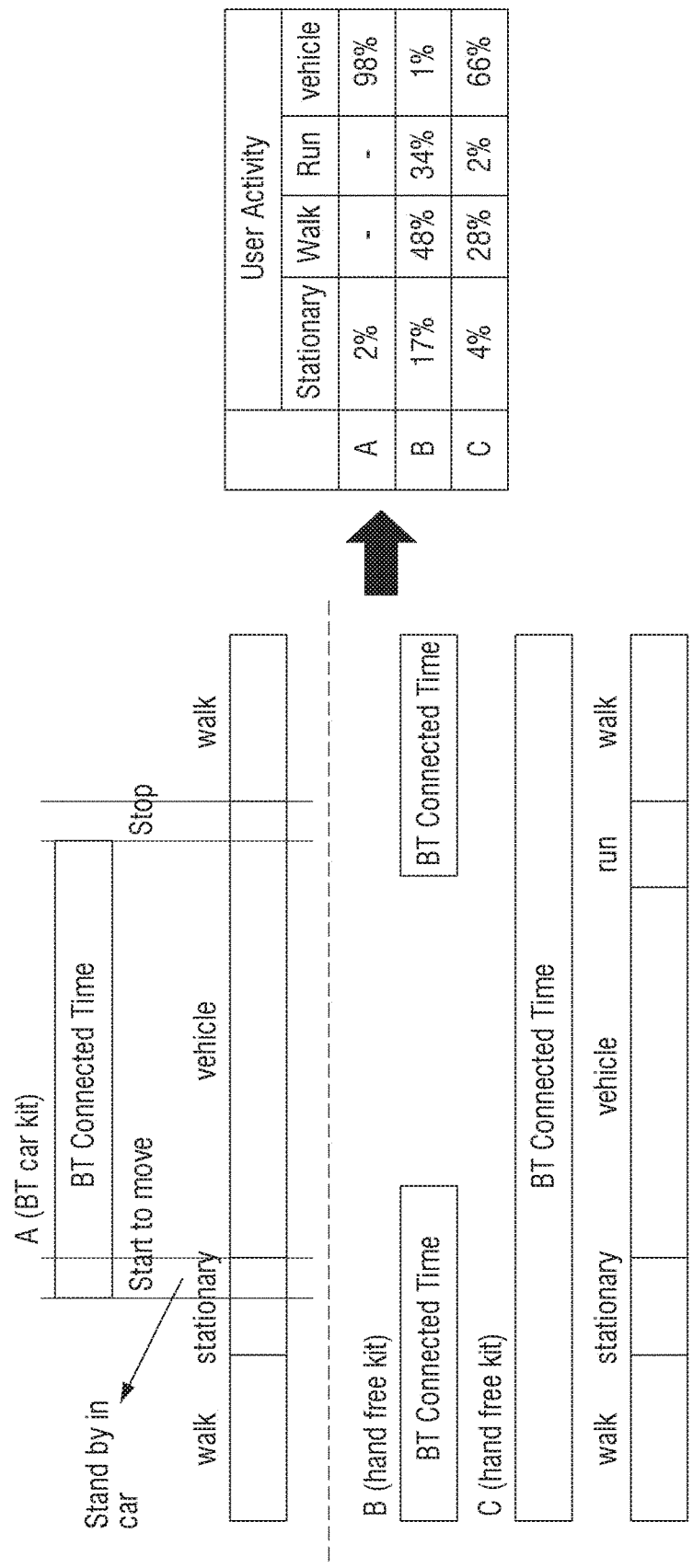
FIG. 10 is a diagram for understanding a user activity state in consideration of user characteristics in a user terminal according to an embodiment of the present disclosure.

FIG. 10 is a diagram for understanding a user activity state in consideration of user characteristics in a user terminal according to an embodiment of the present disclosure.

Referring to FIG. 10, the user terminal 100 may determine whether the vehicle is the vehicle of the user based on the BT connection state with the electronic device of the vehicle for the preset time and the device information on the electronic devices having a high search frequency among the searched peripheral electronic devices and provide the event information on the operation state of the vehicle.

In detail, a user terminal 100 may be monitored as being communication-connected with the electronic device (hereinafter, referred to as BT car kit) of the vehicle for the preset time when the vehicle is mainly driving and B user terminal 100 may be monitored as being communication connection with the peripheral devices (hereinafter, referred to as hand free kit) of the user when the user mainly performs the activity. Further, C user terminal 100 may be monitored as being communication connection with the hand free kit for the preset time when the user performs the activity or the vehicle is driving.

In this case, the A to C user terminals 100 may predict and determine the operation state of the vehicle depending on the communication connection state of the A to C user terminals 100 on the basis of the monitored result for the preset time.

That is, if the A user terminal 100 is communication connection with the BT car kit, the A user terminal 100 may determine that the vehicle is driving on the basis of the monitored result for the preset time. Therefore, if the A user terminal 100 releases the communication connection with the BT car kit of the vehicle or the corresponding BT car kit is not searched on the search list, the A user terminal 100 may determine that the vehicle is parked and guide that the vehicle is parked.

Further, if the B user terminal 100 is communication connection with the hand free kit, the B user terminal 100 may determine that the current user is in the activity for the preset time on the basis of the monitored result and if the B user terminal 100 releases the communication connection with the hand free kit, the B user terminal 100 may determine that the vehicle of the user is driving and guide that the vehicle is driving.

Further, if the C user terminal 100 is communication connection with the hand free kit, the C user terminal 100 may predict and determine that the user is in the activity or the vehicle is driving on the basis of the monitored result for the preset time.

As described above, the user terminal 100 may determine whether the user is currently in the activity or is driving the vehicle or the vehicle is in the parked state on the basis of various patterns.

Hereinafter, the operation of providing UI based on the moving route of the user terminal 100 will be described in detail.

Figure 11:
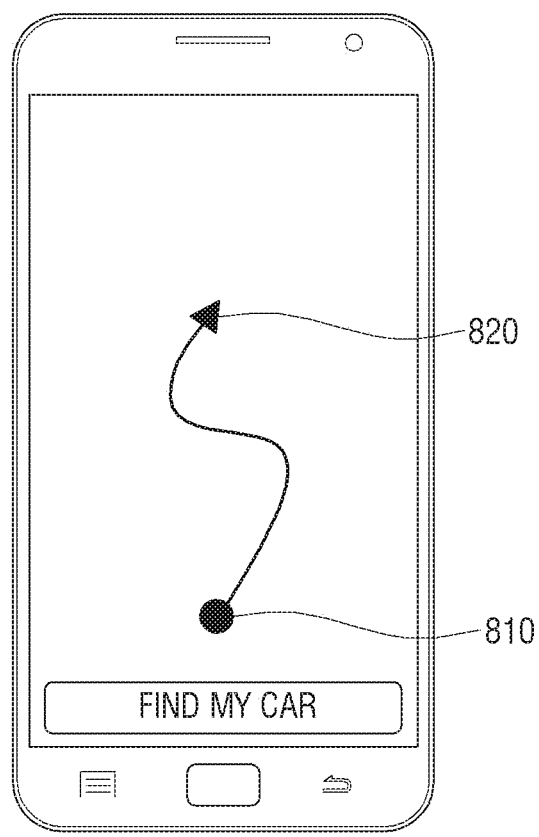
FIG. 11 is a diagram for displaying a moving route UI in a user terminal according to an embodiment of the present disclosure.

FIG. 11 is a diagram for displaying a moving route UI in a user terminal according to an embodiment of the present disclosure.

Referring to FIG. 11, the user terminal 100 may move from a first point 810 where a vehicle is parked to a second point 820. In this case, the user terminal 100 may generate the moving route UI on the basis of the movement information acquired in real time while the user moves from the first point to the second point and display the generated moving route UI. That is, the user terminal 100 may display, on the screen, the moving route UI generated on the basis of the movement information from the first point 810 where the vehicle is parked to the second point where the user moves from the first point on foot to be currently located.

Figures 12A, 12B, 12C:
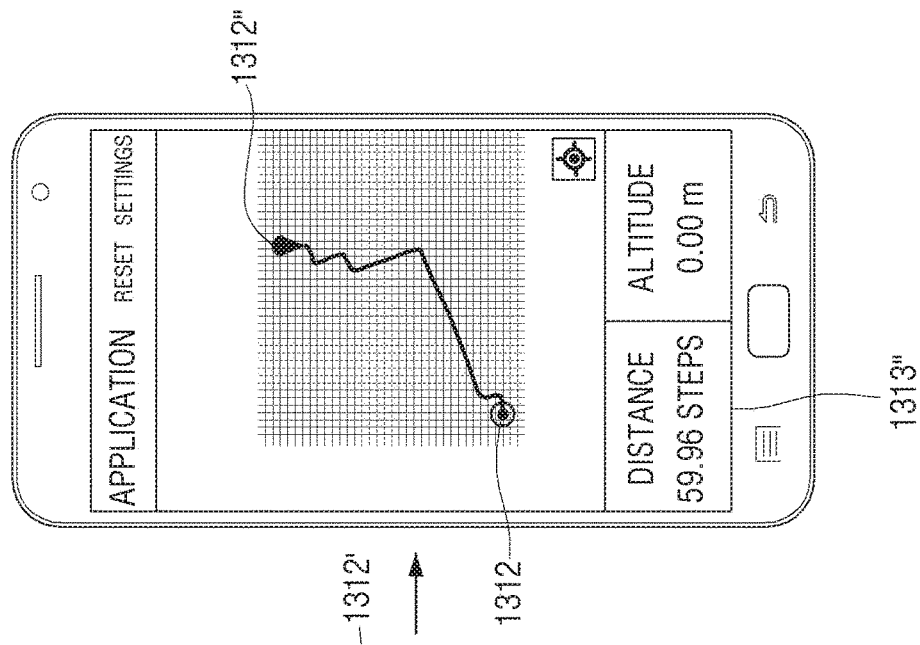
FIGS. 12A, 12B, and 12C illustrate diagrams for displaying a moving route UI in a user terminal according to various embodiments of the present disclosure.

FIGS. 12A to 12C are diagrams for displaying a moving route UI in a user terminal according to various embodiments of the present disclosure.

Referring to FIG. 12A, the user terminal 100 displays, on a UI 1310, first and second icons 1311 and 1312 each representing the point where the corresponding vehicle is parked (hereinafter, referred to as the first point) and the point where the user is located if it is determined that the vehicle of the user is parked according to various embodiments of the present disclosure as described above. Next, if it is determined that the user activity starts, the user terminal 100 displays the moving route depending on the movement of the user on the UI 1310 in real time.

In this case, the user terminal 100 may display the UI 1310 displaying the moving route depending on the movement of the user on one region of the screen and provide route information 1313 on the moving route along which the user moves based on the first point where the vehicle is parked to the other region of the screen. Here, the route information 1313 may include at least one of the step information and the altitude information depending on the movement of the user.

In detail, as illustrated in FIG. 12A, when the first point where the vehicle is parked and the point where the user is located are the same, the step information and the altitude information included in the route information 1313 may be 0.

That is, if the user does not move from the first point where the vehicle is parked, the user terminal 100 may determine that the step and pressure related events depending on the movement of the user are not generated and display the route information 1313 in which the step information and the pressure information are 0 in the UI 1310 in which the first icon 1311 on which the location of the vehicle parked in one region is displayed and the second icon 1312 on which the location of the user is displayed are displayed at the same point and in the other region.

Next, if the user moves from the first point to the second point, the user terminal 100 may display the second icon 1312, which is displayed at the first point, at a second point 1312' as illustrated in FIG. 12B. At the same time, the user terminal 100 may provide the route information 1313' including the step information and the altitude information while the user moves from the first point to the second point.

Meanwhile, if the user moves to a third point 1312" after passing the second point, the user terminal 100 provides route information 1313" including step information and altitude information from the first point to the third point as illustrated in FIG. 12C. In this case, the user terminal 100 may provide information on movement time taken for the user to move from the first point to the third point by including the movement time information in the route information 1313" that includes the step information and the altitude information from the first point to the third point.

The user may confirm in what form his/her vehicle moves from the parked point in real time on the basis of the route information 1313" displayed on the user terminal 100 and the user may confirm the distance, the required time, or the like from the point where the user is currently located to the point where his/her vehicle is parked on the basis of the displayed route information.

Figure 13A:
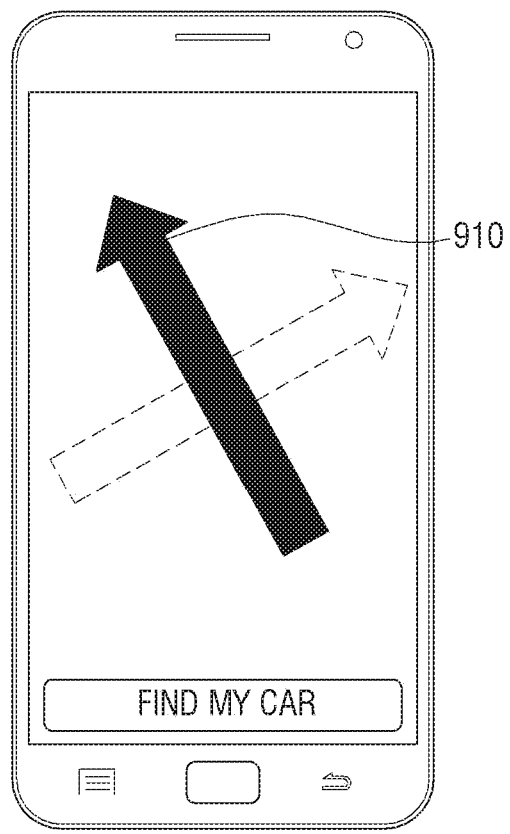
FIGS. 13A and 13B illustrate diagrams for displaying a route guidance UI in a user terminal according to various embodiments of the present disclosure.
Figure 13B:
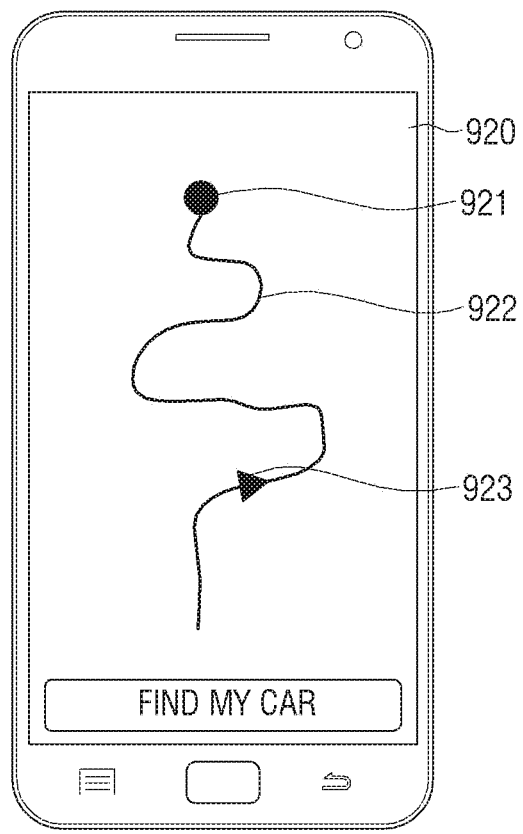

FIGS. 13A and 13B are diagrams for displaying a route guidance UI in a user terminal according to an embodiment of the present disclosure.

Referring to FIGS. 13A and 13B, if a user command for return to a first point is input, the user terminal 100 may display the route guidance UI for guiding a route from a second point where the user is currently located to the first point where the vehicle is parked according to the following embodiment.

In detail, as illustrated in FIG. 13A, if the user command for return to the first point is input, the user terminal 100 may display a route guidance UI 910 including an indicator in an arrow form that indicates the direction returning to the first point.

That is, if the user command for return to the first point is input, the user terminal 100 back tracks the direction in which the user terminal 100 moves from the acquired movement information on the basis of the moving route from the first point to the second point where the user is currently located to set the route from the second point where the user is currently located to the first point where the vehicle is parked. Next, the user terminal 100 may display the route guidance UI 910 including the indicator in an arrow form that indicates the direction returning to the first point on the basis of the direction information per the step of the user moving to the first point.

For example, the movement information of the user terminal 100 may store the information on the number of 100 steps of the user and the movement direction information per step from the first point to the second point. In detail, the movement direction information corresponding to each of 1 to 30 steps may be a 12 o'clock direction, the movement direction information corresponding to each of 31 to 50 steps may be a 3 o'clock direction, and the movement direction information corresponding to each of 51 to 100 steps may be a 11 o'clock direction. If the user command for return to the first point is input in the state which the movement information is stored, the user terminal 100 may display the route guidance UI 910 including the indicator indicating a 11 o'clock direction on the basis of the movement direction information of the user terminal 100 corresponding to a final step of the user. At this point, the user terminal 100 may display the route guidance UI 910 including the indicator indicating the 11 o'clock direction until the continued step of the user is 50th. Next, the user terminal 100 may display the route guidance UI 910 including the indicator indicating a 3 o'clock direction from a $51^{th}$ step of the user to an 80$^{th}$ step of the user and may display the route guidance UI 910 including the indicator indicating a 12 o'clock direction from a 81$^{st}$ step of the user to a 100$^{th}$ step.

As such, if the user command for return is input, the user terminal 100 displays the indicator indicating the direction corresponding to the movement direction information per step on the basis of the pre-stored movement information on the screen. Therefore, the user may easily and quickly move to the point where his/her vehicle is parked according to the display direction of the indicator displayed on the screen.

Meanwhile, as illustrated in FIG. 13B, if the user command for return to the first point is input, the user terminal 100 may display a route guidance UI 920 including the entire moving route 922 from the second point where the user is currently located to a first point 921 where the vehicle of the user is parked. Further, the user terminal 100 may provide the point where the user terminal 100 is currently located on the entire moving route 922. That is, the user terminal 100 may display an icon 923 representing the point where the user terminal 100 is currently located on the entire moving route 922.

Therefore, the user may understand the entire moving route up to the first point 920 where the vehicle is parked using the route guidance UI 920 displayed on the screen of the user terminal 100 to move to the first point 921. In addition, the user terminal 100 displays the icon 923 representing the point which the user terminal 100 is currently located on the entire moving route 922, such that the user may not only know at which point the user is currently located using the icon 923 displayed on the entire moving route 922, but may schematically confirm the moving distance from the second point to the first point 921 and the remaining distance from the current position of the user to the first point 921.

Meanwhile, the present disclosure restrictively describes only the case in which the user terminal 100 provides the route guidance UI 910 including the indicator indicating the direction corresponding to the movement direction information per step according to the user command or the route guidance UI 920 providing the entire moving route. However, the present disclosure is not limited thereto, and therefore the user terminal 100 may provide the mix of the route guidance UI 910 including the indicator indicating the direction corresponding to the movement direction information per step or the route guidance UI 920 providing the entire moving route, according to the user command. That is, the user terminal 100 may display the route guidance UI 910 including the indicator indicating the direction corresponding to the movement direction information per step and display the route guidance UI 920 providing the entire moving route if the second user command is input in the state in which the route guidance UI 910 is displayed, according to the first user command.

In addition, if the second user command is input, the user terminal 100 may display the route guidance UI 920 providing the entire moving route for a preset time and display the route guidance UI 910 including the indicator indicating the direction corresponding to the movement direction information per each step if the preset threshold time lapses.

FIGS. 14A and 14B are diagrams for displaying a route guidance UI in a user terminal according to another embodiment of the present disclosure.

Referring to FIGS. 14A and 14B, if a user command for return to a first point is input, the user terminal 100 may display the route guidance UI for guiding a route from a second point where the user is currently located to the first point where the vehicle is parked according to the following embodiment.

In detail, as illustrated in FIG. 14A, if the user command for return to the first point is input, the user terminal 100 may display a route guidance UI 910 including an indicator 1410 in an arrow form that indicates the direction returning to the first point and the route guidance UI including movement route information 1010 including the distance information and the altitude information up to the first point.

As described above, if the user command for return to the first point is input, the user terminal 100 back tracks the direction in which the user terminal 100 moves from the acquired movement information on the basis of the moving route from the first point to the second point where the user is currently located to set the route from the second point where the user is currently located to the first point where the vehicle is parked. Next, the user terminal 100 may display, in the first region, the indicator 1410 in an arrow form that indicates the direction returning to the first point on the basis of the direction information per the step of the user to the first point.

In addition, the user terminal 100 may display the moving route information 1010 including the distance information and the altitude information up to the first point where the vehicle is parked in the second region.

That is, the user terminal 100 may measure the remaining distance from the current location of the user to the first point from the remaining number of steps on the basis of the step corresponding to the current location of the user. Further, the user terminal 100 may acquire the altitude information based on the difference between the pressure information sensed by the pressure sensor 115 at the current location of the user and the pressure information included in the pre-stored movement information.

Therefore, the user may confirm the remaining distance up to the first point where the vehicle is parked and the floor where the corresponding vehicle is parked on the basis of the moving route information 1010 including the distance information and the altitude information.

Meanwhile, as illustrated in FIG. 14B, if the user command for return to the first point is input, the user terminal 100 may display a route guidance UI 910 including an indicator 1410' in an arrow form that indicates the direction returning to the first point and including movement route information 1020 including the distance information, the altitude information, and the estimated time of arrival information up to the first point.

As described above, if the user command for return to the first point is input, the user terminal 100 back tracks the direction in which the user terminal 100 moves from the acquired movement information on the basis of the moving route from the first point to the second point where the user is currently located to set the route from the second point where the user is currently located to the first point where the vehicle is parked. Next, the user terminal 100 may display, in the first region, the indicator 1410 in an arrow form that indicates the direction returning to the first point on the basis of the direction information per the step of the user moving to the first point.

In addition, the user terminal 100 may display the moving route information 1020 including the distance information, the altitude information, and the estimated time of arrival information up to the first point where the vehicle is parked in the second region.

That is, the user terminal 100 may measure the remaining distance from the current location of the user to the first point and the estimated time of arrival from the remaining number of steps on the basis of the step corresponding to the current location of the user. Further, the user terminal 100 may acquire the altitude information based on the difference between the pressure information sensed by the pressure sensor 115 at the current location of the user and the pressure information included in the pre-stored movement information.

Therefore, the user may confirm the remaining distance up to the first point where the vehicle is parked, the floor where the corresponding vehicle is parked, and the estimated time of arrival up to the first point on the basis of the moving route information 1020 including the distance information, the altitude information, and the estimated time of arrival information.

Figure 15:
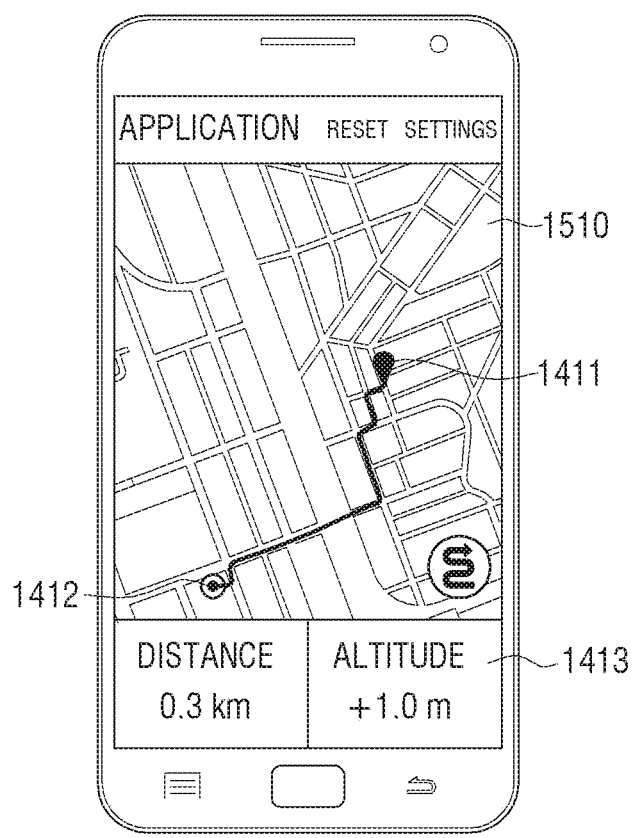
FIG. 15 is a diagram for displaying a route guidance UI in a user terminal according to an embodiment of the present disclosure.

FIG. 15 is a diagram for displaying a route guidance UI in a user terminal according to still another embodiment of the present disclosure.

Referring to FIG. 15, when a GPS signal is received, the user terminal 100 may receive a map corresponding to a current location of the user terminal 100 from an external server (not illustrated) on the basis of the received GPS signal and display an entire moving route from a second point 1412 where the user is currently located to a first point 1411 where the vehicle of the user is parked on the received map UI 1510.

That is, if the user command for return to the first point is input, the user terminal 100 displays the entire moving route from the second point 1412 where the user is currently located in the first region to the first point 1411 where the vehicle of the user is parked on the map UI 1510.

In addition, the user terminal 100 may display moving route information 1413 including the distance information and the altitude information up to the first point where the vehicle is parked in the second region.

Therefore, the user may move to the first point 1411 where the vehicle of the user is parked through the map UI 1510 including the entire moving route displayed in the first region and may confirm the remaining distance to the first point where the vehicle is parked and the floor where the corresponding vehicle is parked on the basis of the moving route information 1413 displayed in the second region.

Meanwhile, according to an embodiment of the present disclosure, when the user terminal 100 moves from the first point where the vehicle of the user is parked to the second point, an operation of acquiring the movement information of the user terminal 100 using the motion sensor and providing the UI that performs a guide to the first point on the basis of the previously acquired movement information if the user command for return to the first point is input will be described in detail. However, the present disclosure is not limited thereto, and therefore the user terminal 100 may transmit the movement information of the user terminal 100 to the other user terminal 100 that may communicate with the user terminal 100. In this case, the other user terminal 100 may guide the point where the user terminal 100 is currently located on the basis of the movement information received from the user terminal 100.

As such, when the movement information of the user terminal 100 is transmitted to the other user terminal 100 that may communicate with the user terminal 100, it may be used in various service fields like stray child prevention.

Hereinafter, a control method of the user terminal 100 according to an embodiment of the present disclosure will be described in detail.

Figure 16:
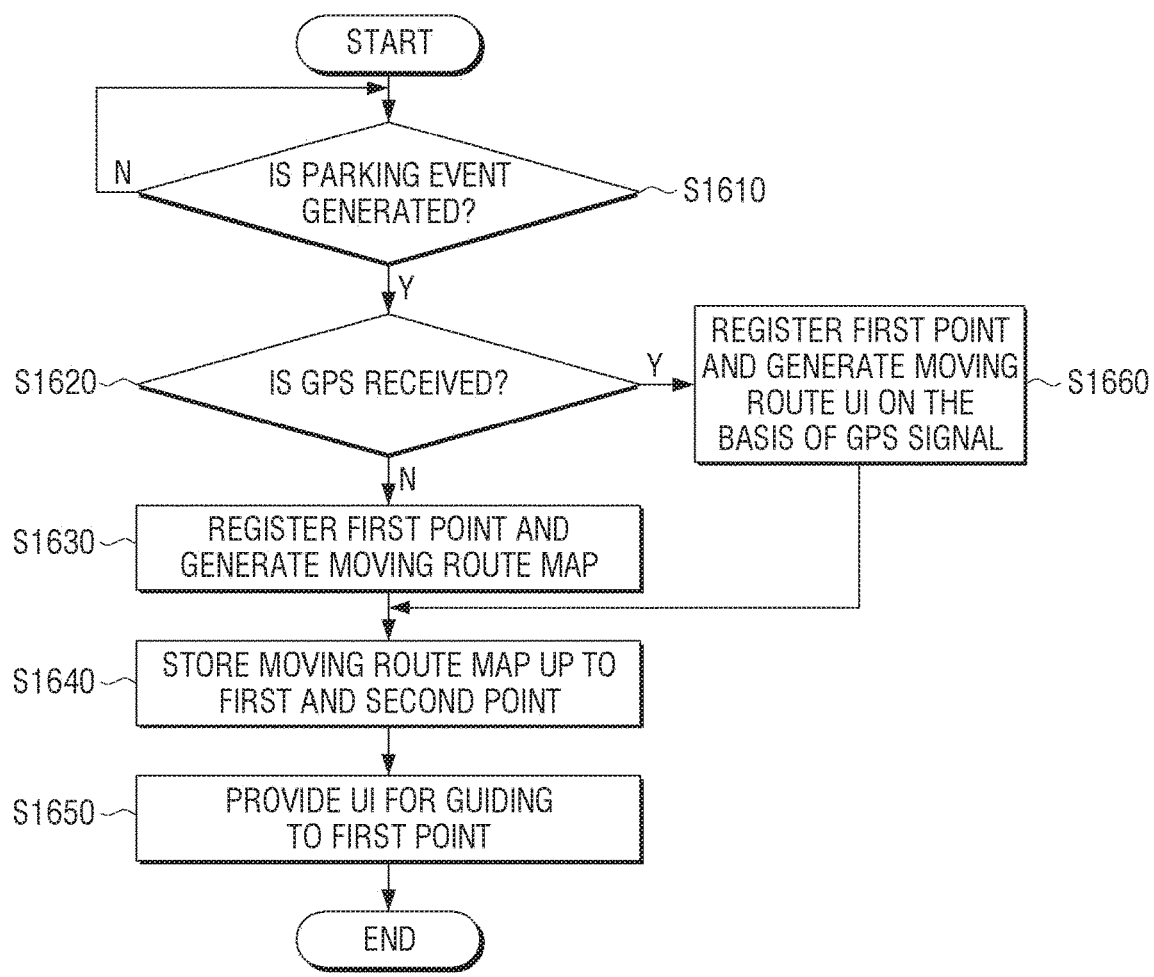
FIG. 16 is a flow chart of a control method of a user terminal according to an embodiment of the present disclosure.

FIG. 16 is a flow chart of a control method of a user terminal according to an embodiment of the present disclosure.

Referring to FIG. 16, the user terminal 100 determines whether a preset parking event is generated and determines whether a GPS may be received if it is determined that the preset parking event is generated at operations S1610 and S1620.

In detail, when the user is driving the vehicle, the user terminal 100 may determine whether the parking event on whether the driving vehicle is parked is generated according to the following embodiment.

According to an embodiment of the present disclosure, the user terminal 100 may determine that the parking event on whether the vehicle is parked is generated on the basis of whether the communication connection between the NFC module like BT and the electronic device of the vehicle is released.

According to another embodiment of the present disclosure, the user terminal 100 may determine the electronic devices having a high search frequency as the electronic device of the vehicle, on the basis of search list information about peripheral electronic devices searched by the NFC module 161 like BT. Therefore, the user terminal 100 may determine whether the vehicle is parked if the previously determined electronic devices based on the search list information searched by the NFC module like BT are not searched.

In addition, the user terminal 100 may determine that the vehicle is parked if the electronic devices registered by the user are not searched by the NFC module.

Meanwhile, when the vehicle temporarily stops, the communication connection between the NFC module and the electronic devices of the vehicle is temporarily released or the electronic devices of the corresponding vehicle may not be temporarily searched in the search list information. In this case, the user terminal 100 may determine whether the communication connection between the NFC module and the electronic devices of the vehicle is reconnected within a preset threshold time or the electronic devices of the vehicle are not searched within the preset threshold time to determine whether the parking event that the vehicle is parked is generated.

As described, if it is determined that the parking event that the vehicle is parked is generated on the basis of various embodiments of the present disclosure, the user terminal 100 determines whether the GPS signal may be received. As the determination result, if the GPS signal may not be received, the user terminal 100 registers, as the first point, the sensing information and the time information sensed by the accelerometer sensor after the timing when it is determined that the parking event is generated to the first point where the user terminal 100 is located and generates a moving route map at operation S1630.

Next, the user terminal 100 uses a plurality of sensors to acquire the movement information of the user terminal 100 that moves from the first point where the user terminal 100 is registered and stored to the second point and stores the moving route map up to the first and second points on the basis of the acquired movement information at operation S1640. Here, the movement information of the user terminal 100 may include the information on the number of steps of the user using the user terminal 100 and the information on the movement direction of the user terminal 100.

When the user terminal 100 moves from the first point to the second point, the user terminal 100 may use a plurality of sensors included in the sensor 110 to acquire the movement information of the user terminal 100. Here, the movement information of the user terminal 100 may include the information on the number of steps of the user using the user terminal 100 and the information on the movement direction of the user terminal 100.

In detail, if the first point representing the timing at which the user parks the vehicle and then starts to walk is registered, the user terminal 100 may use the accelerometer sensor to acquire the information on the number of steps of the user and use the gyroscope sensor to acquire the movement direction information of the user terminal 100.

In more detail, after the first point is registered, the user terminal 100 determines a step of a user on the basis of the sensing information sensed by the accelerometer sensor. That is, the user terminal 100 may determine the step of the user and the number of steps on the basis of sensing variation sensed by the accelerometer sensor. Further, the user terminal 100 may use the gyroscope sensor to acquire the movement direction information of the user terminal 100 and match and store the movement direction information per the step of the user.

Meanwhile, the movement direction information of the user terminal 100 may be acquired according to the following embodiment of the present disclosure.

In detail, the user terminal 100 creates a world coordinate system from the magnetic sensor and the gravity sensor and aligns angular velocity values of X, Y, and Z axes acquired from the gyroscope sensor on the world coordinate system on the basis of a rotation matrix. Next, the user terminal 100 may obtain angles per step from the align information per the step of the user determined on the basis of the sensing information sensed by the accelerometer sensor and acquire the movement direction information of the user terminal 100 from the angles per step.

Meanwhile, when the movement pattern of the user terminal 100 has the specific pattern while the user terminal 100 moves, the user terminal 100 filters the movement information having the specific pattern among the movement information of the user terminal 100.

Therefore, the user terminal 100 may record and store only the movement information on the movement direction information per step generated while the user is substantially walking.

Further, if the change in altitude of the user terminal 100 is sensed on the basis of the pressure information sensed by the pressure sensor, the user terminal 100 may store information on the sensed change in altitude by further including the information in the movement information.

If the movement information of the user terminal 100 is acquired according to various embodiments, the user terminal 100 may generate the moving route map on the basis of the acquired movement information and store the generated moving route map. In addition, the user terminal 100 may generate the UI for the moving route map and display the generated UI. Therefore, the user may confirm, in real time, the moving route while he/she moves from the first point where his/her vehicle is parked to the second point where the user is currently located on the basis of the UI for the displayed moving route map.

According to various embodiments of the present disclosure, in the state in which the movement information map from the first point where the vehicle of the user is parked to the second point to which the user moves is stored or displayed in real time, if the user command for return to the first point is input, the user terminal 100 provides the UI for guiding to the first point on the basis of the pre-stored moving route map at operation S1650.

According to an embodiment of the present disclosure, if the user command for return to the first point is input, the user terminal 100 may display the route guidance UI including an indicator in an arrow form that indicates the direction returning to the first point.

According to another embodiment of the present disclosure, if the user command for return to the first point is input, the user terminal 100 may display the route guidance UI including the entire route moving from the second point where the user is currently located to the first point. In this case, the user terminal 100 displays an icon representing the location of the user terminal 100 on the route guidance UI. Therefore, the user terminal 100 may display the route guidance UI on which the icon representing the location of the user terminal 100 is displayed.

Meanwhile, when the location of the user terminal 100 is located within a specific distance from the first point, the user terminal 100 may provide a feedback guiding that it approaches the first point. According to an embodiment of the present disclosure, if the user terminal 100 is located at the first point and within the specific distance, the user terminal 100 may provide at least one of an alarm feedback, a vibration feedback, and a message feedback to guide that the user terminal 100 approaches the first point.

Meanwhile, according to additional aspects of the present disclosure, the user terminal 100 may display at least one of the distance information, the altitude information, and the estimated time of arrival information between the first point and the user terminal 100 in one region. In detail, the user terminal 100 may display, in one region, the indicator in an arrow form indicating the direction returning to the first point or the route guidance UI representing the entire route and display, in the other region, the moving route information including at least one of the distance information, the altitude information, and the estimated time of arrival information between the second region where the user terminal is currently located and the first region where the vehicle of the user is parked.

Therefore, the user may move to the first point where the his/her vehicle is located through the route guidance UI displayed in one region and may refer to the moving route information (distance information, altitude information, and estimated time of arrival information) displayed in the other region to more easily confirm the remaining distance from the current location to the first point or a floor where the vehicle is parked.

Meanwhile, in the foregoing operation S1620, if the user terminal 100 determines that the GPS may be received, the user terminal 100 registers the first point where the user terminal 100 is located on the basis of the received GPS signal and generates the moving route UI at operation S1660. That is, the user terminal 100 may acquire the location information on the basis of the GPS information per step depending on the movement of the user using the user terminal 100 and acquire the movement information on the basis of the acquired location information. Therefore, the user terminal 100 may generate the moving route UI from the acquired movement information on the basis of the GPS information.

Meanwhile, the user terminal 100 may determine whether the GPS signal may be periodically received to acquire the movement information on the basis of the received GPS signal if it is determined that the GPS signal may be received and acquire the movement information on the basis of the movement direction per the step of the user sensed by the motion sensor if it is determined that the GPS signal may not be received.

Next, the user terminal 100 may store the moving route map from the first and second points on the basis of the movement information of the user terminal 100 moving from the first point to the second point in the foregoing operation S1640. Hereinafter, if the user command for return to the first point where the vehicle is parked is input, the user terminal 100 may display the UI for guiding to the first point on the basis of the pre-stored moving route map like the foregoing operation S1250.

Meanwhile, the control method of the user terminal 100 for providing the route guidance service as described above may be implemented by at least one execution program that may be stored in a non-transitory computer readable medium.

The non-transitory computer readable medium is not a medium that stores data therein for a while, such as a register, a cache, a memory, or the like, but means a medium that semi-permanently stores data therein and is readable by a device. In detail, the foregoing programs may be stored in various types of recording media that are readable by a terminal, such as a RAM, a flash memory, a ROM, an erasable programmable ROM (EPROM), an electronically erasable programmable ROM (EEPROM), a register, a hard disk, a removable disk, a memory card, a USB memory, a compact-disk (CD) ROM, and the like.

Hereinabove, the present disclosure has been described with reference to various embodiments thereof.

While the present disclosure has been shown and described with reference to various embodiments hereof, it will be understood by those skilled in the art that various changes in form and details may be made therein without departing from the spirit and scope of the present disclosure as defined by the appended claims and their equivalents.

What is claimed is:

1. A control method of a user terminal comprising:
   identifying whether the user terminal receives a global positioning system (GPS) signal;
   in response to identifying that the user terminal does not receive the GPS signal, registering a first point based on an output of a motion sensor of the user terminal;
   in response to registering the first point based on the motion sensor, acquiring movement information associated with a route of the user terminal using the motion sensor based on the user terminal moving from the first point to a second point; and
   providing a user interface (UI) for guiding the user terminal from the second point to the first point based on the movement information in response to receiving an input indicative of an instruction to discontinue route tracking at the second point.

2. The control method as claimed in claim 1, wherein the registering of the first point includes:
   identifying user activity using the motion sensor; and
   registering a point where the user terminal is located as the first point based on the user activity satisfying a preset condition.

3. The control method as claimed in claim 1, wherein the acquiring movement information associated with the route of the user terminal using the motion sensor comprises:
   acquiring an output of an accelerometer sensor and a gyroscope sensor,
   identifying information associated with a number of steps associated with the user terminal based on the output of the accelerometer sensor, and
   identifying information associated with a movement direction of the user terminal based on the output of the gyroscope sensor.

4. The control method as claimed in claim 3, wherein the acquiring of the movement information associated with the route of the user terminal using the motion sensor further comprises:
   acquiring an output of a pressure sensor, and
   identifying information associated with a change in altitude of the user terminal based on the output of the pressure sensor.

5. The control method as claimed in claim 1, wherein the acquiring of the moving information comprises filtering moving information having a specific pattern among the movement information of the user terminal when a moving pattern of the user terminal has the specific pattern while the user terminal moves.

6. The control method as claimed in claim 1, further comprising:
   displaying a moving route UI on the basis of the movement information acquired in real time while the user terminal moves from the first point to the second point.

7. The control method as claimed in claim 1, wherein the providing of the UI comprises providing a route guidance UI including an indicator in an arrow form indicating a direction returning to the first point.

8. The control method as claimed in claim 1, wherein the providing of the UI comprises providing an indication that the user terminal is approaching the first point when the user terminal is located within a specific distance from the first point.

9. The control method as claimed in claim 1, wherein the providing of the UI comprises providing a route guidance UI including an entire route moving from the second point to the first point and a location of the user terminal within an overall route in real time.

10. The control method as claimed in claim 7, wherein the providing of the UI further comprises providing, in one region, at least one of distance information, altitude information, or estimated time of arrival information between the first point and the user terminal.

11. A user terminal comprising:
    a communication interface;
    a display;
    a motion sensor sensing movement of the user terminal;
    a memory storing movement information of the user terminal sensed by the motion sensor; and
    at least one processor configured to:
      identify whether the user terminal receives via the communication interface a global positioning system (GPS) signal,
      in response to identifying that the user terminal does not receive the GPS signal, store a first point in the memory based on an output of the motion sensor,
      in response to registering the first point based on the motion sensor, acquire movement information associated with a route of the user terminal using the motion sensor based on the user terminal moving from the first point to a second point, and
      control the display to display a user interface (UI) for guiding the user terminal from the second point to the first point based on the movement information in response to receiving an input indicative of an instruction to discontinue route tracking at the second point.

12. The user terminal as claimed in claim 11, wherein the at least one processor is further configured to:
    identify user activity based on an output of the motion sensor, and register a point where the user terminal is located as the first point and stores the first point in the memory based on the user activity satisfying a preset condition.

13. The user terminal as claimed in claim 11,
wherein the motion sensor comprises an accelerometer sensor and a gyroscope sensor; and
wherein, to acquire the movement information associated with the route of the user terminal, the at least one processor is further configured to:
acquire an output of the accelerometer sensor,
identify information associated with a number of steps associated with the user terminal based on the output of the accelerometer sensor,
acquire an output of the gyroscope sensor, and
identify information associated with a movement direction of the user terminal based on the output of the gyroscope sensor.

14. The user terminal as claimed in claim 13,
wherein the motion sensor further comprises a pressure sensor, and
wherein, to acquire the movement information associated with the route of the user terminal, the at least one processor is further configured to:
acquire an output of the pressure sensor, and
identify information associated with a change in altitude of the user terminal based on the output of the pressure sensor.

15. The user terminal as claimed in claim 11, wherein the at least one processor is further configured to filter moving information having a specific pattern among the movement information of the user terminal when a moving pattern of the user terminal has the specific pattern while the user terminal moves.

16. The user terminal as claimed in claim 11, wherein the at least one processor is further configured to control the display to display a moving route UI on the basis of the movement information acquired in real time while the user terminal moves from the first point to the second point.

17. The user terminal as claimed in claim 11, wherein the at least one processor is further configured to control the display to display a route guidance UI including an indicator in an arrow form indicating a direction returning to the first point.

18. The user terminal as claimed in claim 11, wherein the at least one processor is further configured to provide an indication that the user terminal is approaching the first point when the user terminal is located within a specific distance from the first point.

19. The user terminal as claimed in claim 11, wherein the at least one processor is further configured to control the display to display a route guidance UI including an entire route moving from the second point to the first point and display a location of the user terminal within an overall route in real time.

20. A non-transitory computer-readable storage medium configured to store one or more computer programs including instructions that, when executed by at least one processor, cause the at least one processor to control for:
identifying whether a user terminal receives a global positioning system (GPS) signal;
in response to identifying that the user terminal does not receive the GPS signal, registering a first point based on an output of motion sensor of the user terminal;
in response to registering the first point based on the motion sensor, acquiring movement information associated with a route of the user terminal using the motion sensor based on the user terminal moving from the first point to a second point; and
providing a user interface (UI) for guiding the user terminal from the second point to the first point based on the movement information in response to receiving an input indicative of an instruction to discontinue route tracking at the second point.

* * * * *